(12) United States Patent
Magdi

(10) Patent No.: US 8,156,548 B2
(45) Date of Patent: Apr. 10, 2012

(54) IDENTIFICATION AND AUTHENTICATION SYSTEM AND METHOD

(75) Inventor: Nabil Magdi, Box Hill (AU)

(73) Assignee: Future Internet Security IP Pty Ltd., Sydney (AU)

( * ) Notice: Subject to any disclaimer, the term of this patent is extended or adjusted under 35 U.S.C. 154(b) by 1214 days.

(21) Appl. No.: 11/602,584

(22) Filed: Nov. 20, 2006

(65) Prior Publication Data

US 2007/0136589 A1 Jun. 14, 2007

Related U.S. Application Data

(63) Continuation-in-part of application No. PCT/AU2005/000728, filed on May 20, 2005.

(30) Foreign Application Priority Data

May 20, 2004 (AU) .............................. 2004902674
Nov. 30, 2005 (AU) .............................. 2005906717

(51) Int. Cl.
*H04L 29/06* (2006.01)
*H04L 9/32* (2006.01)
*G06F 11/30* (2006.01)
*G06F 12/14* (2006.01)

(52) U.S. Cl. ............. 726/7; 713/152; 713/168; 713/192

(58) Field of Classification Search ........................ None
See application file for complete search history.

(56) References Cited

U.S. PATENT DOCUMENTS

| | | | |
|---|---|---|---|
| 5,307,510 A * | 4/1994 | Gunmar et al. ............ | 455/67.11 |
| 5,661,806 A | 8/1997 | Nevoux et al. | |
| 6,230,002 B1 | 5/2001 | Floden et al. | |
| 6,275,936 B1 | 8/2001 | Kyojima et al. | |
| 6,477,650 B1 * | 11/2002 | Kokubo .......................... | 726/26 |
| 6,678,821 B1 | 1/2004 | Waugh et al. | |
| 6,760,711 B1 | 7/2004 | Gillett et al. | |
| 6,779,115 B1 * | 8/2004 | Naim ............................. | 713/192 |
| 7,113,600 B1 * | 9/2006 | Rosenhed ..................... | 380/272 |

(Continued)

FOREIGN PATENT DOCUMENTS

WO WO02/13568 A1 2/2002

(Continued)

OTHER PUBLICATIONS

International Search Report for PCT/AU2006/001825 (4 pages).
Mark Weitz, Smart Card Devices, Windows IT Pro [online], Jun. 2001 (2 pages).
Anz.com, Providing Enhanced Security to Online Trade Services, Jul. 20, 2005 (2 pages).

(Continued)

*Primary Examiner* — Shin-Hon Chen
(74) *Attorney, Agent, or Firm* — Steven M. Jensen; Edwards Wildman Palmer LLP

(57) ABSTRACT

An identification system 1 used for authenticating a user at a user station 30 requesting access to secure information at a base station 20, wherein the system 1 includes one or more base stations 20, one or more user stations 30, and one or more identification devices 10 used for authenticating the user of the user station 30. The identification device 10 is coupled to a user station 30. The device 10 includes a plurality of device codes and identity data, to receive an identification request from the base station 20, generate an identification response including an identification code using the plurality of device codes and a plurality of algorithms, and, transfer the identification response back to the base station 20. The base station 20 authenticates the user's request for secure information by using the identification response.

21 Claims, 35 Drawing Sheets

U.S. PATENT DOCUMENTS

| | | | | |
|---|---|---|---|---|
| 7,298,841 | B2* | 11/2007 | Sewell et al. | 380/43 |
| 7,353,211 | B2* | 4/2008 | Hans et al. | 705/67 |
| 2002/0099942 | A1 | 7/2002 | Gohl | |
| 2002/0187808 | A1 | 12/2002 | Vallstrom et al. | |
| 2002/0188849 | A1* | 12/2002 | Kwan | 713/176 |
| 2003/0069014 | A1* | 4/2003 | Raffel et al. | 455/426 |
| 2003/0115490 | A1* | 6/2003 | Russo et al. | 713/202 |
| 2003/0221107 | A1* | 11/2003 | Kang | 713/176 |

FOREIGN PATENT DOCUMENTS

| | | |
|---|---|---|
| WO | WO2005/045649 | 5/2005 |
| WO | WO2005/115045 A1 | 12/2005 |

OTHER PUBLICATIONS

International Search Report for International Application No. PCT/AU2005/000728, filed on May 20, 2005 (3 pages).

International Preliminary Report on Patentability for International Application No. PCT/AU2005/000728, filed on May 20, 2005 (8 pages).

Supplemental European Search Report for European Application 05742118.2 (Jan. 4, 2012).

K. Boman et al. "UMTS security," Electronics and Communication Engineering Journal, Institution of Electrical Engineers, vol. 14, No. 5, Oct. 2002, pp. 191-204.

* cited by examiner

IDENTIFICATION AND AUTHENTICATION SYSTEM AND METHOD

CROSS-REFERENCE TO RELATED CASES

This is a Continuation-in-Part of, and claims priority to and the benefit of, International Application No. PCT/AU2005/000728 which has an International Filing Date of May 20, 2005, and which designates the U.S. This also claims priority to and the benefit of Australian Provisional Application No. 2005906717, filed on Nov. 30, 2005. International Application No. PCT/AU2005/000728 claims priority to and the benefit of Australian Application No. 2004902674 which was filed in Australia on May 20, 2004. The entirety of each of these three applications is incorporated herein by reference.

BACKGROUND OF THE INVENTION

The present invention relates to an identification system for authenticating a user. The present invention also relates to authenticating data transferred relating to an activity.

DESCRIPTION OF THE PRIOR ART

The reference to any prior art in this specification is not, and should not be taken as, an acknowledgment or any form of suggestion that that prior art forms part of the common general knowledge.

Whenever computers are used to perform various personal and commercial activities, secure access is a major area of concern in virtually all applications. A number of disaster stories exist related to "hackers" gaining unauthorised access to various computer systems, and therefore private and confidential data.

With the exponential growth of the Internet in recent years, the security problem has compounded due to a significant number of commercial services available to users. A major issue is that most users, who are not technically minded, do not understand the intricacies of communication protocols and network architectures, therefore leaving them vulnerable to attacks from hackers.

With the growing number of attacks and security breaches taking place on a regular basis, the existing Internet environment has significantly undermined any public confidence in the security of Internet access to private information such as banking activities.

Over the past few years, financial institutions have strategically focused on the Internet as a means of customer access to reduce their branch service costs. They have spent significant funds to upgrade their gateways and security software. This trend, coupled with continued significant publicised Internet security breaches within the current environment, indicates that there continues to exist a very strong need for a cost effective process that can be implemented to facilitate a "hacker" proof communication link between institutions and their customers.

Most solutions currently in place rely on user names/personal identification numbers and passwords, however, these are not completely effective, because "hackers" continue to find ways through the use of elaborate techniques, such as "phantom cookies" and "keyloggers", to emulate software functionality and record keystroke entries.

In the majority of applications, once the entry of a user name/personal identification number and password is received and authenticated by the host system, complete access is granted, regardless of whether the person entering this information is the genuine customer or a "hacker" who has obtained the information through fraudulent means. Furthermore, in most cases, it is only when a customer discovers the existence of unknown transfers of funds that the fraud becomes evident. By then the damage has already been done.

The tools and schemes devised to date continue to rely upon sophisticated and costly processes that require downloaded software, or devices that generate keys that must be synchronised with a host system. Other behavioural and physical identification devices are also available such as signature recorders and verifiers, fingerprint recorders and verifiers, and retinal recorders and verifiers.

The above devices are extremely sophisticated, complex to set up, costly to maintain and upgrade, and require elaborate support software. Unless both recording and verification functions are set up at the individual PC level for these devices, they require transmission of recordings for verification and therefore are also open to interception by hackers who can record and emulate identical transmissions.

Only when institutions provide each customer with devices such as hand held electronic PIN/Password generators, can secure entry be ensured. However, establishing and maintaining such devices is extremely costly to all concerned and can only be used on a one-on-one basis. Therefore, if a customer has accounts with multiple institutions that apply the same identifying technique, they would need multiple PIN/Password generators.

Although there is a multitude of options available to confirm individual identification, the effective solutions that are currently available are both complex and costly to implement and maintain. Further, personal computing skill levels of Internet customers vary significantly where there are extreme ranges of competency ranging from novice to expert. As a consequence, financial institutions have adopted the use of the user names/personal identification numbers and passwords as it is the simplest and least costly solution available. Unfortunately, it is also the least effective solution.

Another problem that exists once the user's identity is authenticated and access is granted is that data transferred between a user and another entity can be altered by a malicious entity, before the data is being received by the other entity.

For example, a user may obtain access to an Internet banking web-site allowing transactions to be performed. When a transaction, such as a transfer of funds from the user account to another account is performed, a Trojan or a keylogger can maliciously detect the transaction before it is transferred and can alter the data. Therefore, the transaction is incorrect as the incorrect funds or the incorrect account has been specified in the data transferred to the other entity. Other examples, not related to Internet banking, include eavesdropping by other entities on a discussion over a communication medium, such as a telephone or a chat program on a computer.

There exists a need for a device, method and system to securely authenticate a user. Furthermore, there exists a need for a device, method and system to securely authenticate activities relating to the transfer of data.

SUMMARY OF THE INVENTION

The present invention seeks to provide a device, system and method which overcomes the drawbacks of the prior art.

The present invention also seeks to provide a device, system and method which enables a higher degree of "hacker" proof communication between users and a base station, such as, but not limited to, a financial institution.

The present invention also seeks to provide a device, system and method for authenticating the identity of a user at a user station when communicating with a base station, typically a financial institution, by using an identification device having plurality of device codes, which is connected to a user station and appropriately identified when establishing a communication link with the base station.

In a first broad form the present invention provides a method of a user obtaining access to secure information stored on a base station using an identification device, the identification device includes:
  a store including:
  code data; and,
  at least one predetermined rule; and,
  a processor;
the method including, in the identification device:
  determining at least one algorithm;
  receiving, from the base station, request data indicative of at least one parameter;
  generating modified code data using:
    the at least one algorithm;
    the at least one parameter; and,
    the code data;
  generating ordered data using:
    the at least one predetermined rule;
    the at least one parameter; and,
    the modified code data;
  transferring, to the base station indicating data at least partially indicative of the ordered data, thereby allowing the base station to authenticate the user using the indicating data.

Optionally the method includes:
generating the modified code data by ordering the modified code data according to the at least one predetermined rule using the at least one parameter.

Optionally the method includes receiving, from the base station, the request data further indicative of the at least one algorithm.

Optionally the identification device includes in the store the at least one algorithm, wherein the method includes:
  retrieving from the store the at least one algorithm;
  transferring, to the base station, the indicating data being further indicative of identity data to thereby allow the base station to determine the at least one algorithm stored in the identification device.

Optionally the identification device includes in the store at least one second algorithm, wherein the method includes:
  receiving, from the base station, the request data further indicative of the at least one algorithm;
  retrieving, from the store, the at least one second algorithm;
  generating the modified data using the at least one second algorithm; and,
  transferring, to the base station, the indicating data being further indicative of identity data to thereby allow the base station to determine the at least one second algorithm stored in the identification device.

Optionally the identification device includes in the store at least one third algorithm, wherein the method includes:
  generating the ordered data by using the at least one third algorithm; and
  transferring, to the base station, the at least one third algorithm.

Optionally the method includes, in the identification device:
  transferring the indicating data being partially indicative of the identity data, wherein the identity data includes:
    an device identity of the identification device;
    a generation identity of the identification device; and,
    a grouping identity of the identification device.

Optionally the method includes, in the identification device:
  coupling the identification device to a user station;
  receiving, via the user station, the request data; and,
  transferring, via the user station, the indicating data.

Optionally the identification device includes driver software, wherein the method includes, in the identification device:
  recognising the coupled user station;
  installing the driver software on the user station.

Optionally the method includes, in the identification device:
  updating, from the base station, the driver software.

Optionally the identification device includes a temperature sensor, wherein the method includes:
  sensing a temperature of the identification device; and
  comparing the sensed temperature to a minimum threshold and a maximum threshold stored in the store;
  if the sensed temperature is below the minimum threshold, deleting the data in the store; and;
  if the sensed temperature is above the maximum threshold, deleting the data in the store.

Optionally the identification device includes an encryption module, wherein the method includes, in the identification device:
  encrypting, using the encryption module, the indicating data.

Optionally the method includes, in the identification device, generating a key which is used for encrypting the response data.

Optionally the method includes, in the identification device:
  generating a key; and,
  encrypting, using the key and the encryption module, the indicating data.

Optionally the method includes:
embedding the key in the encrypted indicating data.

Optionally the method includes generating the key using electronic interference.

Optionally the identification device includes a decryption module, and wherein the method includes, in the identification device:
  receiving the request data from the base station; and,
  decrypting, using the decryption module, the request data.

Optionally the method includes, in the identification device:
  decrypting the request data using at least one of:
    a key stored in the identification device store; and,
    a key generated by the identification device.

Optionally the method includes, in the identification device:
  identifying a false identification request; and,
  generating a false identification response.

Optionally the method includes, in the identification device:
  generating a random number;
  using the random number to generate the false identification response.

Optionally the method includes generating the random number using electronic interference.

In a second broad form the present invention provides an identification device used by a user to obtaining access to secure information stored on a base station, the identification device includes:
  a store including:
  code data; and,
  at least one predetermined rule; and,
  a processor;

the identification device processor being adapted to:
  determine at least one algorithm;
  receive, from the base station, request data indicative of at least one parameter;
  generate modified code data using:
    the at least one algorithm;
    the at least one parameter; and,
    the code data;
  generate ordered data using:
    the at least one predetermined rule;
    the at least one parameter; and,
    the modified code data;
  transfer, to the base station indicating data at least partially indicative of the ordered data, thereby allowing the base station to authenticate the user using the indicating data.

In a third broad form the present invention provides a method of a base station authenticating a user using an identification device for obtaining access to secure information stored on the base station, the identification device includes:
  a store including:
    code data; and,
    at least one predetermined rule; and,
  a processor;
the base station includes:
  a processor; and,
  a data store including:
    the at least one predetermined rule;
    at least one parameter;
the method including, in the base station:
  transferring, to the user station, request data at indicative of the at least one parameter;
  receiving, from the user station, indicating data generated by the identification device by:
    generating modified code data using:
      at least one algorithm;
      the at least one parameter; and,
      the code data;
    generating ordered data using:
      the at least one predetermined rule;
      the at least one parameter; and,
      the modified code data;
  determining the at least one algorithm used by the identification device;
  reversely applying the at least one algorithm to the indicating data using the at least one predetermined rule and the at least one parameter to generate the code data, thereby allowing the base station to authenticate the user.

Optionally the method includes, in the base station:
  generating the code data by reversely applying the at least one predetermined rule to the modified data using the at least one parameter to reorder the modified code data.

Optionally the method includes in the base station, transferring the request data further indicative of the at least one algorithm stored in the base station's data store.

Optionally the method includes, selecting the at least one algorithm from a plurality of first algorithms.

Optionally the identification device includes in the store the at least one algorithm, wherein the method includes:
  receiving, from the identification device, the indicating data being further indicative of identity data to thereby allow the base station to determine the at least one algorithm stored in the identification device.

Optionally the base station's data store includes the at least one algorithm and the identification device's store includes at least one second algorithm, wherein the method includes:
  transferring, from the base station, the request data further indicative of the at least one algorithm;
  receiving, from the identification device, the indicating data being further indicative of identity data, the indicating data being further generated by the identification device by applying the at least one second algorithm;
  determining, using the identity data the at least one second algorithm stored in the identification device; and;
  reversely applying the at least one second algorithm to the indicating data.

Optionally the identification device includes in the store at least one third algorithm, wherein the method includes, in the base station:
  receiving, from the identification device, the indicating data being further indicative of the at least one third algorithm, wherein the indicating data is further generated by the identification device by applying the at least one third algorithm to the ordered data.

Optionally the method includes, in the base station:
  receiving the indicating data being partially indicative of the identity data, wherein the identity data includes:
    an device identity of the identification device;
    a generation identity of the identification device; and,
    a grouping identity of the identification device.

Optionally prior to transferring the request data to the identification device, the method includes, in the base station:
  receiving an access request from the user;
  comparing the access request to data in the data store.

Optionally the method includes:
  providing a web page requesting the access request.

Optionally the access request includes a username and a password, wherein the method includes, in the base station:
  comparing the username and the password to data in the data store.

Optionally the method includes in the base station:
  in the event of a successful comparison, transferring the request data to the identification device; and,
  in the event of an unsuccessful comparison, issuing a denial of access.

Optionally the identification device is coupled to a user station, wherein the method includes, in the base station:
  transferring the request data to the identification device, via the user station; and,
  receiving the indicating data from the identification device, via the user station.

Optionally the method includes, in the base station:
  transferring, from the base station, the updated driver software.

Optionally the method includes, in the base station:
  requesting the identification device to transfer indicating data at random intervals during the grant of access.

Optionally the method includes, in the base station:
  requesting the identification device to transfer indicating data at regular intervals during the grant of access.

Optionally the base station includes an encryption module, wherein the method includes, in the identification device:
  encrypting, using the encryption module, the request data.

Optionally the method includes, in the base station:
  encrypting the request data using at least one of:
    a key stored in the identification store and base station store; and,
    a key generated by, and received from, the identification device.

Optionally the identification device includes a decryption module, and wherein the method includes, in the identification device:
  receiving encrypted indicating data from the identification device; and,
  decrypting, using the decryption module, the request data.

Optionally the method includes:
  decrypting the response data using a key generated by the identification device.

Optionally the identification device transfers indicating data including an embedded key to decrypt the encrypted indicating data, wherein the method includes, in the base station:
  extracting the embedded key in the encrypted indicating data; and,
  decrypting, using the extracted key and decryption module, the encrypted indicating data.

In a fourth broad from the present invention provides a base station used for authenticating a user using an identification device for obtaining access to secure information stored on the base station, the identification device includes:
  a processor; and,
  a store including:
    code data; and,
    at least one predetermined rule;
the base station includes:
  a processor; and,
  at least one data store including:
    the at least one predetermined rule; and,
    at least one parameter;
the base station processor being adapted to:
  transfer, to the user station, request data at indicative of the at least one parameter;
  receive, from the user station, indicating data generated by the identification device by:
    generating modified code data using:
      the at least one algorithm;
      the at least one parameter; and,
      the code data;
    generating ordered data using:
      the at least one predetermined rule;
      the at least one parameter; and,
      the modified code data;
  determine the at least one algorithm used by the identification device;
  reversely apply the at least one algorithm to the indicating data using the at least one predetermined rule and the at least one parameter to generate the code data, thereby allowing the base station to authenticate the user.

In a fifth broad form the present invention provides a method of a user obtaining access to secure information stored on a base station using an identification device coupled to a station, the identification device includes:
  a plurality of device codes; and,
  an order rule for ordering a plurality of identification code portions to generate an identification code;
the method including, in the identification device:
  receiving, via the user station, an identification request from the base station, wherein the identification request includes an identification code algorithm and a plurality of parameters;
  generating the plurality of identification code portions using:
    the identification code algorithm;
    the plurality of parameters; and,
    the plurality of device codes;
  generating the identification code using:
    the ordering rule;
    the plurality of parameters; and,
    the plurality of identification code portions;
  generating an identification response including the generated identification code; and,
  transferring, via the user station, the identification response; thereby allowing the base station to authenticate and grant access to the user.

In a sixth broad from the present invention provides a method of a user obtaining access to secure information stored on a base station using an identification device coupled to a user station, the identification device includes:
  an identification code algorithm for generating a plurality of identification code portions;
  a plurality of device codes; and,
  an order rule for ordering a plurality of identification code portions to generate an identification code;
the method including, in the identification device:
  receiving, via the user station, an identification request from the base station, wherein the identification request includes a plurality of parameters;
  generating the plurality of identification code portions using:
    the identification code algorithm;
    the plurality of parameters; and,
    the plurality of device codes;
  generating the identification code using:
    the ordering rule;
    the plurality of parameters; and,
    the plurality of identification code portions;
  generating an identification response including the generated identification code and identity data indicative of the identity of the identification device; and,
  transferring, via the user station, the identification response; thereby allowing the base station to authenticate and grant access to the user.

In a seventh broad form the present invention provides a method of a user obtaining access to secure information stored on a base station using an identification device coupled to a user station, the base station includes a first identification code algorithm and the identification device includes:
  a second identification code algorithm;
  a plurality of device codes; and,
  an order rule for ordering a plurality of identification code portions to generate a second identification code;
the method including, in the identification device:
  receiving, via the user station, an identification request from a base station, wherein the identification request includes the first identification code algorithm and a plurality of random numbers;
  generating the plurality of identification code portions using:
    the first identification code algorithm;
    the second identification code algorithm;
    the plurality of random numbers; and,
    the plurality of device codes;
  generating the identification code using:
    the ordering rule;
    the plurality of parameters; and,
    the plurality of identification code portions;
  generating an identification response including the generated identification code and identity data indicative of the identity of the identification device; and,
  transferring, via the user station, the identification response to the base station; thereby allowing the base station to authenticate and grant access to the user.

In an eighth broad form the present invention provides a method of a user obtaining access to secure information stored on a base station using an identification device coupled to a user station, the base station includes a first identification code algorithm and the identification device includes:
  a second identification code algorithm;

a third identification code algorithm;
a plurality of device codes; and,
an order rule for ordering a plurality of identification code portions to generate a second identification code;
the method including, in the identification device:
receiving, via the user station, an identification request from a base station, wherein the identification request includes the first identification code algorithm and a plurality of parameters;
generating the plurality of identification code portions using:
the first identification code algorithm;
the second identification code algorithm;
the third identification code algorithm;
the plurality of parameters; and,
the plurality of device codes;
generating the identification code using:
the ordering rule;
the plurality of parameters; and,
the plurality of identification code portions;
generating an identification response including the generated identification code, the third identification code algorithm and identity data indicative of the identity of the identification device; and,
transferring, via the user station, the identification response to the base station; thereby allowing the base station to authenticate and grant access to the user.

In a ninth broad form, the present invention provides a base station used for authenticating activity data received by the base station and relating to an activity, wherein the base station includes a processing system configured to:
generate a first indication of the activity data received by the base station;
transfer the first indication to a device, thereby allowing determination of the authenticity of the activity data;
receive, from the device, a second indication of the determination; and
in response to a positive authentication, perform the activity.

Preferably, the base station generates a first indication which represents at least some of the activity data received.

Preferably, the base station receives a request for the base station to generate and transfer the first indication.

Preferably, the base station transfers the first indication to a device coupled to a user station.

Preferably, the request includes a first data transfer algorithm, wherein the base station generates the first indication in accordance with the first data transfer algorithm.

Preferably, the request is encrypted, wherein the base station uses a current encryption key to decrypt the request.

Preferably, the request includes a new encryption key, wherein when the request has been decrypted, the current encryption key is updated with the new encryption key.

Preferably, the first indication is encrypted using the new encryption key.

Preferably, the new encryption key is embedded in the request, wherein the base station extracts the new encryption key from the request.

Preferably, the base station randomly generates or selects a second data transfer algorithm which is included with the first indication.

Preferably, the base station embeds the second data transfer algorithm in the first indication.

Preferably, the base station encrypts the first indication with the new encryption key and first data transfer algorithm.

Preferably, the second indication is encrypted, wherein the base station uses the current encryption key to decrypt the second indication.

Preferably, the second indication includes a new encryption key, wherein the base station extracts the new encryption key and updates the current encryption key.

Preferably, the base station performs the activity related to the activity data.

In one embodiment, the activity is a bank transaction, wherein the base station performs the bank transaction in response to a positive authentication.

In one embodiment, once the second indication is received, the base station generates a challenge to determine whether the device is coupled to the user station.

Preferably, if a response to the challenge is not received indicating the device is not coupled to the user station, the activity is not performed.

Preferably, if a response to the challenge is received indicating the device is coupled to the user station, the activity is performed.

Preferably, the base station waits for a predetermined time for the response to the challenge, wherein if the response is not received within the predetermined time, the activity is not performed.

Preferably, if a smart card is coupled to the device and the activity data is related to the smart card, the base station generates smart card data in response to the positive authentication, wherein the smart card data is to be transferred to the smart card.

Preferably, the smart card data is encrypted using the current encryption key.

Preferably, the base station receives a response from the smart card indicating the smart card data was received and stored in the smart card.

Preferably, the base station uses electrical interference to generate random numbers, wherein the random numbers are used to randomly select or generate the second data transfer algorithm.

In a tenth broad form, the present invention provides a method of authenticating activity data received by a base station and relating to an activity, wherein the method includes, in the base station:
generating a first indication of the activity data received by the base station;
transferring the first indication to a device, thereby allowing determination of the authenticity of the activity data;
receiving, from the device, a second indication of the determination; and
in response to a positive authentication, performing the activity.

In an eleventh broad form, the present invention provides a user station for authenticating activity data received by the base station and relating to an activity, wherein the user station includes a processing system configured to:
receive, from a base station, a first indication of the activity data received by the base station;
determine an authenticity of the activity data based on the first indication;
transfer, to the base station, a second indication of the determination of the authenticity of the activity data, wherein in response to a positive authentication, the activity is performed.

Preferably, the user station receives the first indication which represents at least some of the activity data received by the base station.

Preferably, the user station transfers a request for the base station to generate and transfer the first indication.

Preferably, the user station generates the request for the base station to generate and transfer the first indication.

Alternatively, a device is coupled to the user station, wherein the device is instructed by the user station to generate the request for the first indication, and wherein the device transfers the request via the user station to the base station.

Preferably, the first indication is received by the user station from the base station, wherein the user station forwards the first indication to the device.

Preferably, the first indication received by the base station in encrypted.

Preferably, the user station receives a decrypted first indication, wherein the user station determines, using the decrypted first indication, the authenticity of the activity data received by the base station.

Preferably, the user station uses an output device to provide an output of the first indication.

Preferably, the output device is a display of the user station, wherein the display is used to output the first indication to a user at the user station.

Preferably, the user station receives an indication from an input device indicating the authenticity of the activity data received by the base station.

In one embodiment, the user station generates the second indication indicating the authenticity of the activity data.

Preferably, the user station transfers the second indication to the base station.

Alternatively, the user station instructs the device to generate the second indication, wherein the user station forwards the indication of authenticity to the device for generating the second indication.

Preferably, the second indication generated by the device is transferred to the base station via the user station.

Preferably, the second indication is encrypted.

In one embodiment, the user station receives a challenge from the base station requesting that the device generate a response to the challenge, wherein the user station transfers the challenge to the device.

Preferably, the user station forwards a response to the challenge from the device to the base station to indicate the device is coupled to the user station.

In another embodiment, the user station receives smart card data, wherein the user station transfers the smart card data to a smart card coupled to the device.

In a twelfth broad form, the present invention provides a method of authenticating activity data received by a base station and relating to an activity, wherein the method includes, in a user station:
receiving, from a base station, a first indication of the activity data received by the base station;
determining an authenticity of the activity data based on the first indication;
transferring, to the base station, a second indication of the determination of the authenticity of the activity data, wherein in response to a positive authentication, the activity is performed.

In a thirteenth broad form, the present invention provides a device for authenticating activity data received by a base station from a user station and relating to an activity, wherein the device includes a processor configured to:
receive, from a base station, an encrypted first indication of the activity data received by a base station;
decrypt the encrypted first indication, thereby allowing determination of the authenticity of the activity data; and
transfer, to the base station, an encrypted second indication of the determination, wherein in response to a positive authentication, the activity is performed.

Preferably, the device generates a request for the first indication.

Preferably, the device encrypts the request.

Preferably, the device generates a new encryption key, and embeds the new encryption key in the request.

Preferably, the device updates a current encryption key with the new encryption key after encrypting the request.

Preferably, the device generates the request which includes a first data transfer algorithm which is used by the base station to generate the first indication.

Preferably, the device randomly selects the first data transfer algorithm from a plurality of predetermined data transfer algorithms.

Alternatively, the device randomly generates the first data transfer algorithm.

Preferably, the device uses electrical interference to generate random numbers which are used to randomly generate or randomly select the first data transfer algorithm.

Preferably, the device is coupled to a user station, wherein the request is transferred to the base station via the user station.

Preferably, the device includes a third data transfer algorithm, wherein the third data transfer algorithm is used to generate the second indication.

Preferably, the encrypted first indication includes a second data transfer algorithm, wherein device extracts the second data transfer algorithm and generates the second indication using the second data transfer algorithm.

Preferably, the device decrypts the encrypted first indication using the current encryption key.

Preferably, the device receives from the user station an indication of authenticity, wherein the device generates the second indication indicative of the authenticity of the activity data.

Preferably, the device combines the second data transfer algorithm and third data transfer algorithm to generate the second indication.

Preferably, the device sequentially applies the second data transfer algorithm and third data transfer algorithm to generate the second indication.

Preferably, the device encrypts the second indication using the current encryption key.

Preferably, the device generates a new encryption key, embeds the new encryption key in the second indication, and after encrypting the second indication the device updates the current encryption key with the new encryption key.

In one embodiment, the device receives a challenge requesting a response from the device indicating that the device is coupled to the user station, and wherein the device generates a response to the challenge indicating the device is coupled to the user station.

Preferably, the first, second and third data transfer algorithms are encryption algorithms.

Preferably, the first, second and third data transfer algorithms use the current encryption key in the device and base station.

Preferably, the device is the identification device.

In one embodiment, the device is uncoupled from the user station to indicate a negative authenticity of the activity data.

In a fourteenth broad form, the present invention provides a method of authenticating activity data received from a user station and relating to an activity, wherein the method includes, in a device:
receiving, from a base station, an encrypted first indication of the activity data received by a base station;
decrypting the encrypted first indication, thereby allowing determination of the authenticity of the activity data;

transferring, to the base station, an encrypted second indication of the determination, wherein in response to a positive authentication, the activity is performed.

In a fifteenth broad form, the present invention provides a method of authenticating activity data received by a base station and relating to an activity, wherein the method includes:

transferring, from a base station to a device, an encrypted first indication of the activity data received by the base station;

decrypting, in the device, the encrypted first indication;

transferring, from the device to a user station, the first indication, thereby allowing determination of the authenticity of the activity data;

transferring, from the user station to the device, a second indication indicating the determination;

encrypting, in the device, the second indication;

transferring, from the device to the base station;

decrypting, in the base station, the second indication, wherein in response to a positive authentication, the activity is performed.

In a sixteenth broad form, the present invention provides a system for authenticating activity data received from a user station and relating to an activity, wherein the system includes:

a base station including a processing system configured to:
transfer, to the device, an encrypted first indication of the activity data received by the base station;
decrypt an encrypted second indication received from the device;

a device including a processor configured to:
decrypt the encrypted first indication;
transfer the first indication to the user station;
encrypt a second indication of a determination of the authenticity of the activity data; and,
transfer the encrypted second indication to the base station; and;

a user station including a processor configured to:
determine an authenticity of the activity data based on the first indication;
transfer, to the device, the second indication of the determination;

wherein in response to a positive authentication, the activity is performed.

In another form, the present invention provides a method of a user obtaining access to secure information stored on a base station using an identification device, the identification device includes a store including code data, the method including, in the identification device:

receiving, from the base station, request data indicative of at least one parameter and at least one algorithm;
generating indicating data using:
the at least one algorithm;
the at least one parameter; and,
the code data; and
transferring, to the base station, the indicating data, thereby allowing the base station to authenticate the user using the indicating data.

In another broad form, the present invention provides an identification device used by a user to obtaining access to secure information stored on a base station, the identification device includes a store including code data, the identification device being adapted to:

receive, from the base station, request data indicative of at least one parameter and at least one algorithm;
generate indicating data using:
the at least one algorithm;
the at least one parameter; and,
the code data; and
transfer, to the base station, the indicating data, thereby allowing the base station to authenticate the user using the indicating data.

In another broad form, the present invention provides a method of a base station authenticating a user using an identification device for obtaining access to secure information stored on the base station, wherein the method includes, in the base station:

transferring, to the identification device, request data indicative of the at least one parameter and at least one algorithm;
receiving, from the identification device indicating data generated by using the at least one parameter, the at least one algorithm and code data stored in the identification device; and
reversely applying the at least one algorithm to the indicating data using the at least one parameter to generate the code data, thereby allowing the base station to authenticate the user.

In another broad form, the present invention provides a base station used for authenticating a user using an identification device for obtaining access to secure information stored on the base station, wherein the base station is adapted to:

transfer, to the identification device, request data indicative of the at least one parameter and at least one algorithm;
receive, from the identification device indicating data generated by using the at least one parameter, the at least one algorithm and code data stored in the identification device; and
reversely apply the at least one algorithm to the indicating data using the at least one parameter to generate the code data, thereby allowing the base station to authenticate the user.

BRIEF DESCRIPTION OF THE DRAWINGS

The present invention will become more fully understood from the following detailed description of preferred but non-limiting embodiments thereof, described in connection with the accompanying drawing(s), wherein.

DETAILED DESCRIPTION OF THE PREFERRED EMBODIMENTS

Figure 1A:
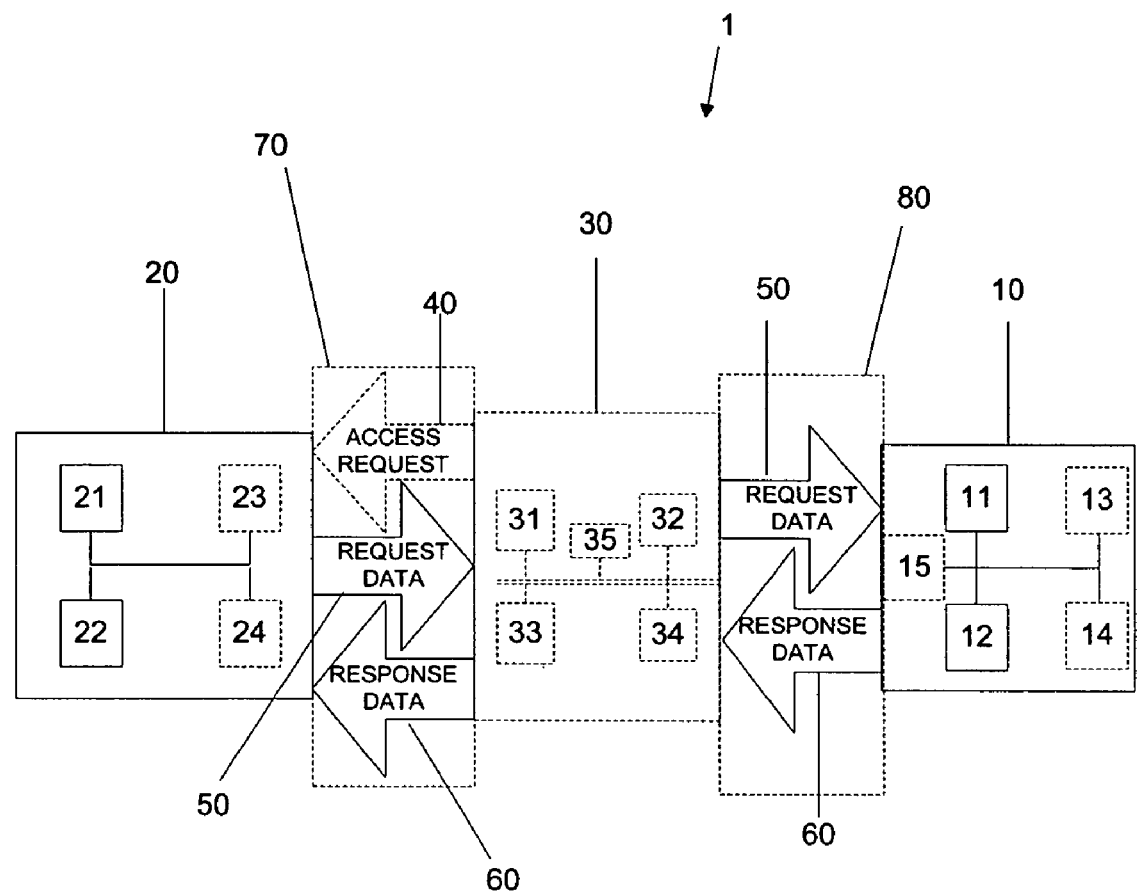
FIG. 1A shows an example of the identification system.

Throughout the drawings, like numerals will be used to identify similar features, except where expressly otherwise indicated.

FIG. 1 shows an example of an identification system 1 including an identification device 10, a base station 20, optionally a user station 30 and a communications network 70.

Shown in FIG. 1A, the identification device 10 and user station 30 may be interconnected via a identification device coupling element 15. The base station 20 and user station 30 may be interconnected via the communications network 70. It will be appreciated that as the user station 30 is optional, the base station 20 and identification device 10 may be interconnected by the communication network 70. It is preferable that one or more gateways may be positioned on the communication network 70 between each user station 30 and base station 20, interconnecting various networks and different communication protocols.

It is noted that the base station 20 can be a financial institution wherein the user station 30 is a customer performing transactions over a network 70. However, the identification system 1 is not limited to this use, and can be used in various other applications such as loyalty point schemes, purchase of products and services, access of private health information, access of private taxation information, access of private company information, voting, and any other systems that require authentication of a user.

The identification device 10 is preferably a compact electronic personal identification device that couples to a user station 30, such that it seeks to identify the user or owner.

The identification device 10 includes a processor 11, a store 12 including code data (also known as device codes) and an order rule. Preferably, the identification device 10 includes a coupling element 15 to optionally couple the identification device 10 to the user station 30, an encryption module 13 and a decryption module 14.

Accordingly, it will be appreciated that the identification device processor 11 may be any form of processor suitably programmed to perform the method, as will be described in more detail below.

The base station 20 includes a processor 21 and a store 22 including an order rule and at least one parameter. Preferably the processor 21 may be adapted to perform encryption and decryption. However, optionally the base station 20 may include an encryption module 23, a decryption module 24.

The user station 30 is a processing system suitable for performing a method of relaying data between the base station 20 and the identification device 10. In particular, the user station 30 generally includes at least a processor 31, a memory 32, and an input device 33, such as a keyboard, an output device 34, such as a display, an external interface 35, such as a port, coupled together via a bus as shown. The user station 30 can be any type of computer device including workstations, personal computers, network connectable information-processing devices, digital home electric appliances, ATM, portable terminals for instance, and cellular phones.

Figure 1B:
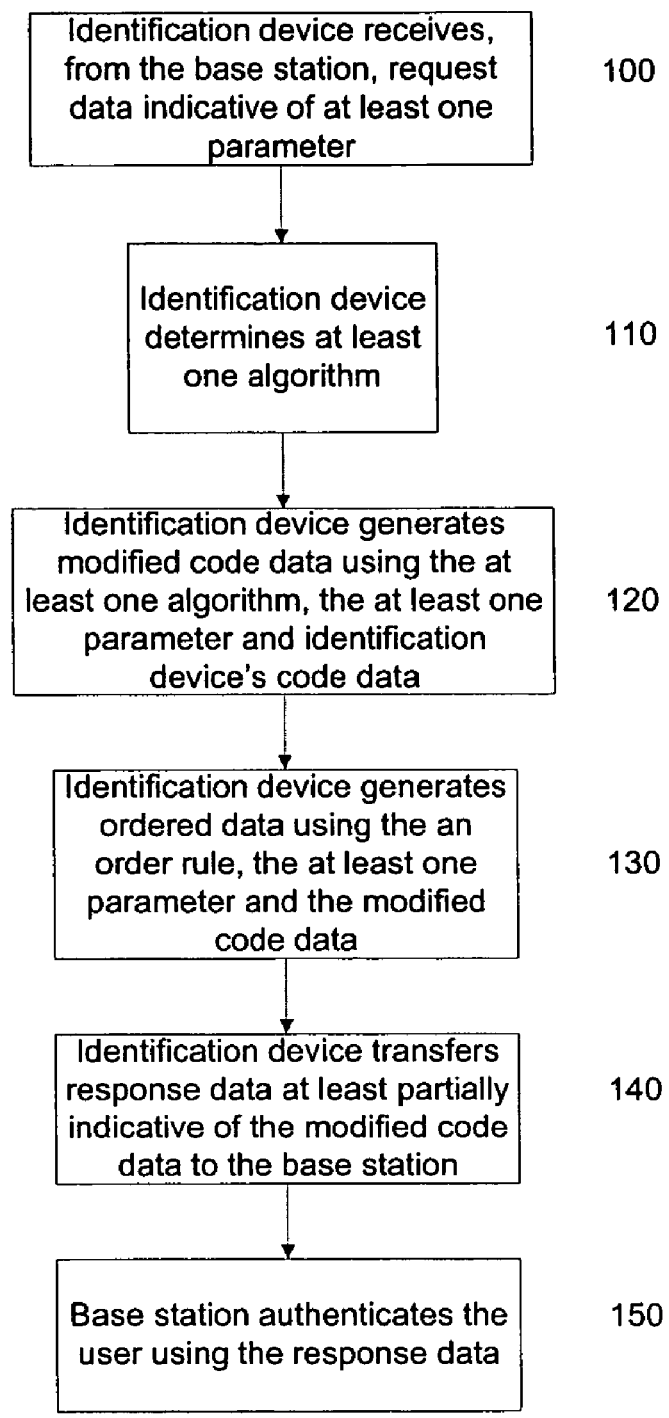
FIG. 1B shows an example of a method of using the identification system.

An example of a method of using the identification system of FIG. 1A will now be described with reference to FIG. 1B.

In particular, at step 100, the identification device 10 receives, from the base station 20, request data 50 indicative of at least one parameter. At step 110, the identification device 10 determines at least one algorithm.

At step 120, the identification device 10 generates modified code data using the determined at least one algorithm, the received at least one parameter and the code data in the identification device store 12. At step 130, the identification device 10 generates ordered data using the order rule, the at least one parameter, and the generated modified code data.

At step 140, the identification device 10 transfers, to the base station 20, response data 60 at least partially indicative of the modified code data. At step 150, the base station 20 authenticates the user of the identification device 10 using the response data 60.

Figure 2A:
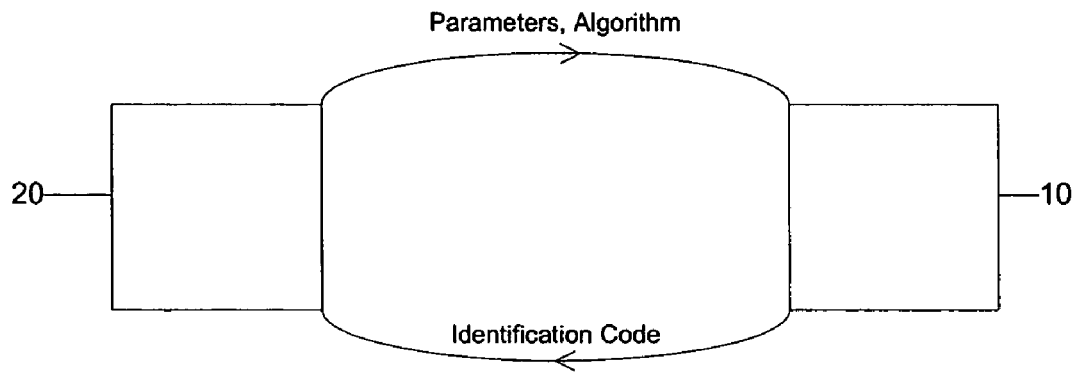
FIG. 2A to 2D shows more detailed examples of the identification system and the data flows.

An example of the identification system showing the flow of data between the identification device 10 and the base station 20 will now be described with reference to FIG. 2A.

In particular, the identification system 1 includes the base station 20 and the identification device 10 interconnected by a communications network 70. It will be appreciated that a user station 30 may be interconnected between the base station 20 and identification device 10 for relaying data. The base station 20 includes a store 22 including at least one parameter and at least one algorithm. The identification device 10 includes a store 12 including code data. The base station 20 transfers the at least one parameter and the at least one algorithm to the identification device 10. The identification device 10 transfers a generated identification code to the base station 20 to be authenticated.

Figure 3A:
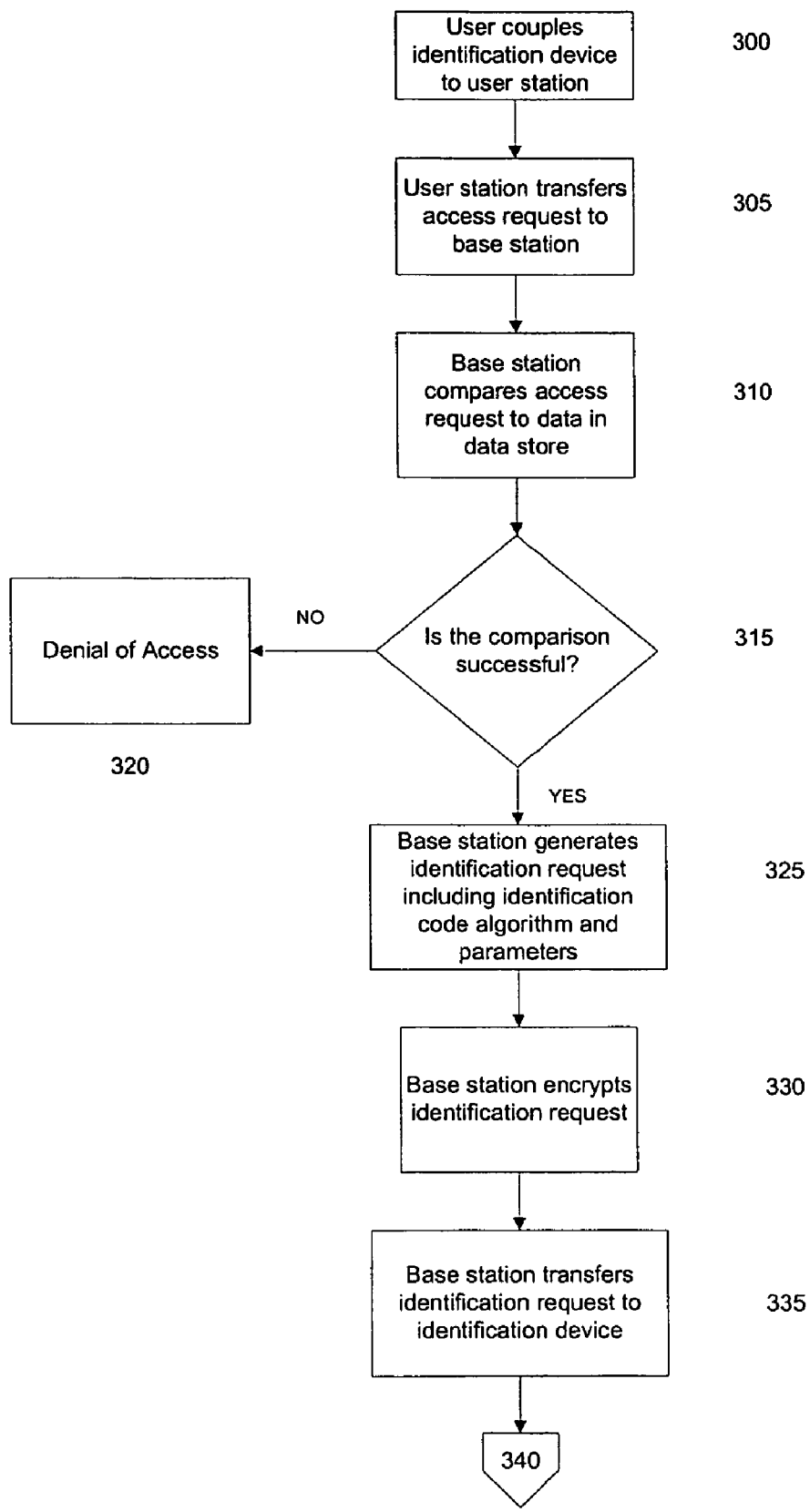
FIG. 3A to 3C shows an example flowchart outlining a method of authenticating a user using the identification system of FIG. 2A.
Figure 3B:
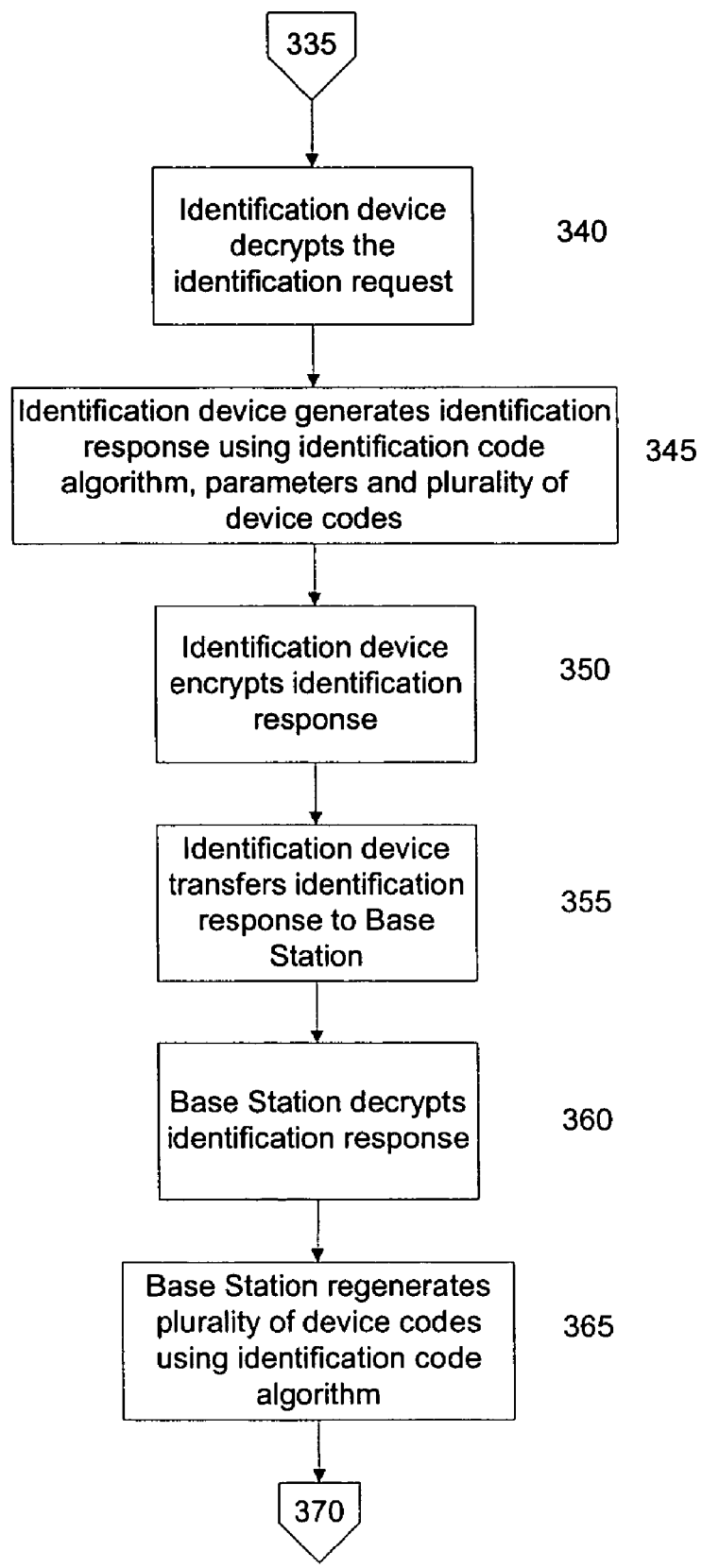
Figure 3C:
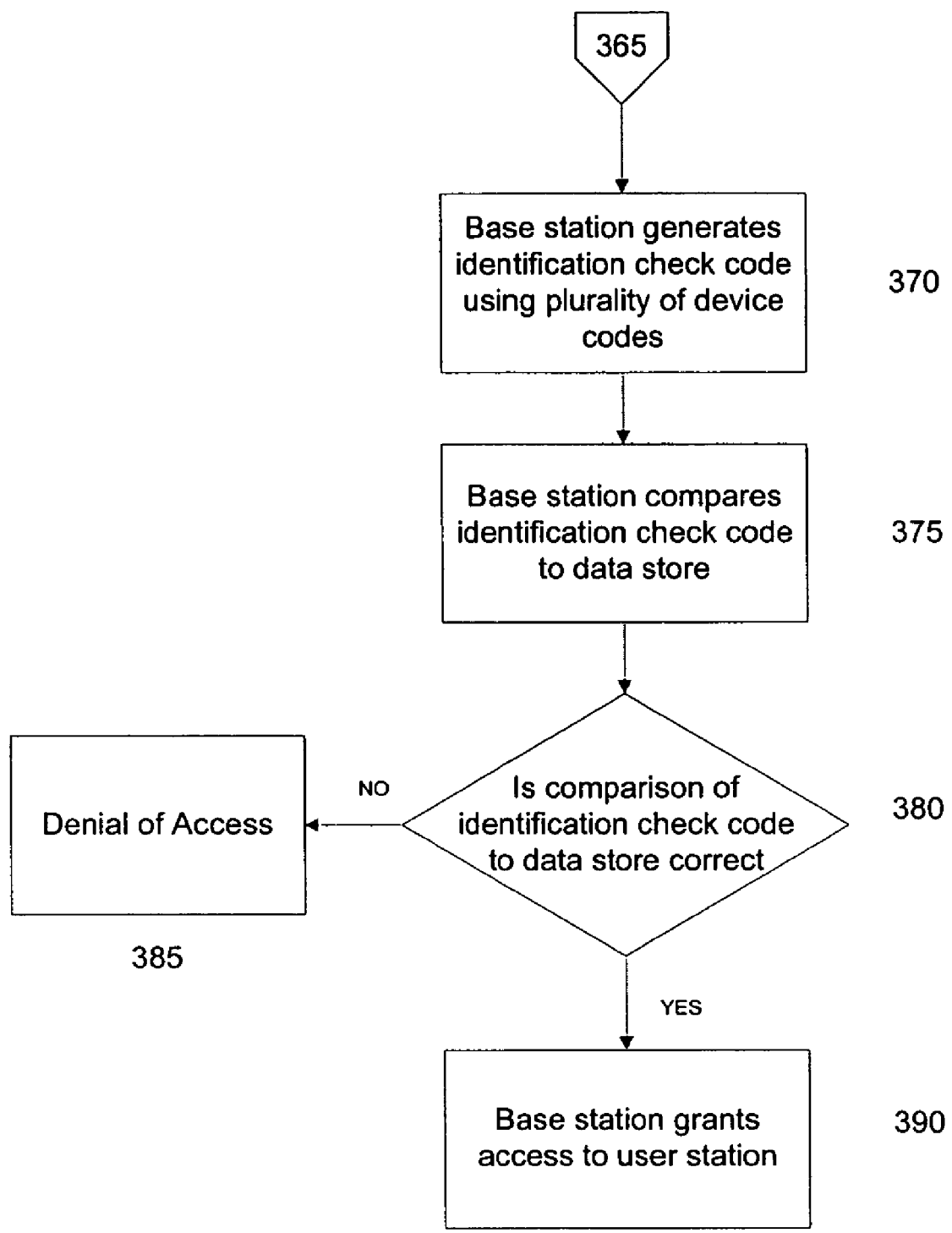
Figure 4A:
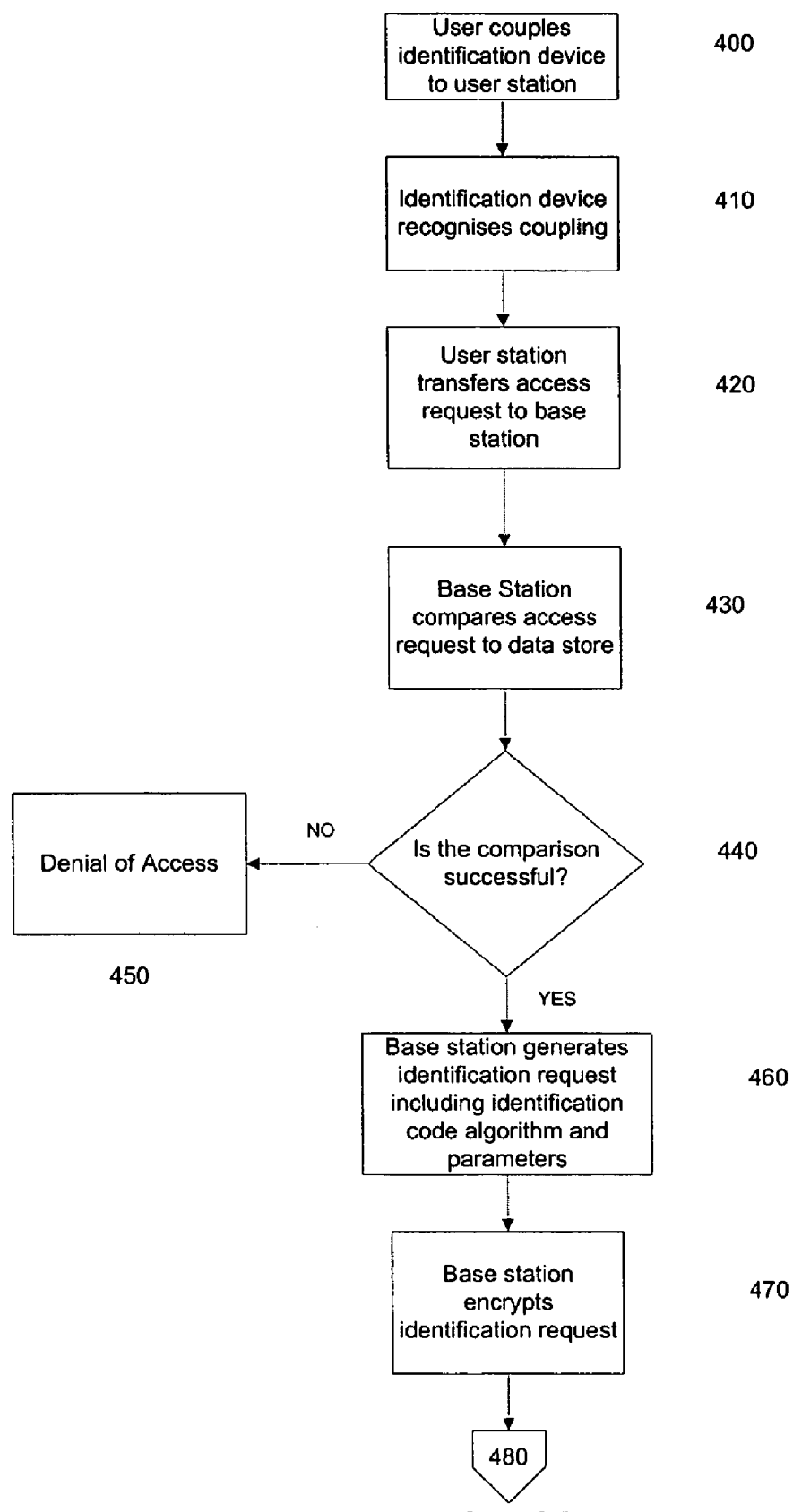
FIG. 4A to 4D shows a more detailed example of the method shown in FIGS. 3A to 3C.
Figure 4B:
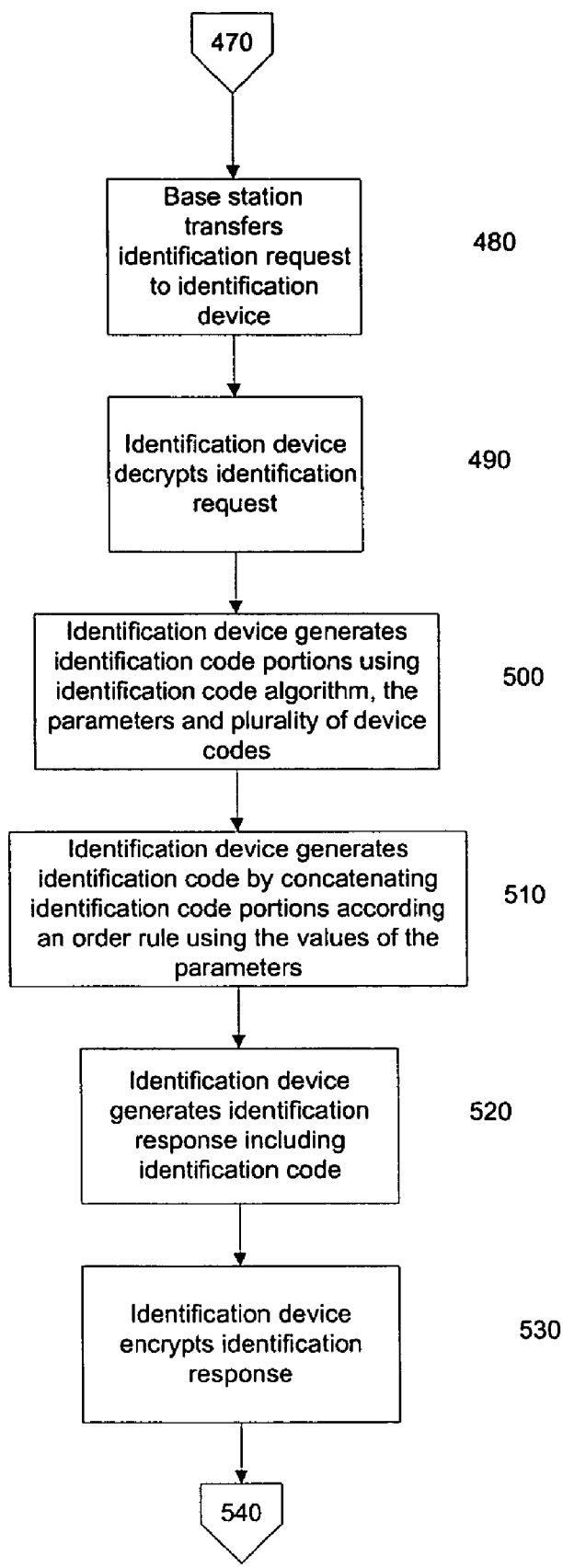
Figure 4C:
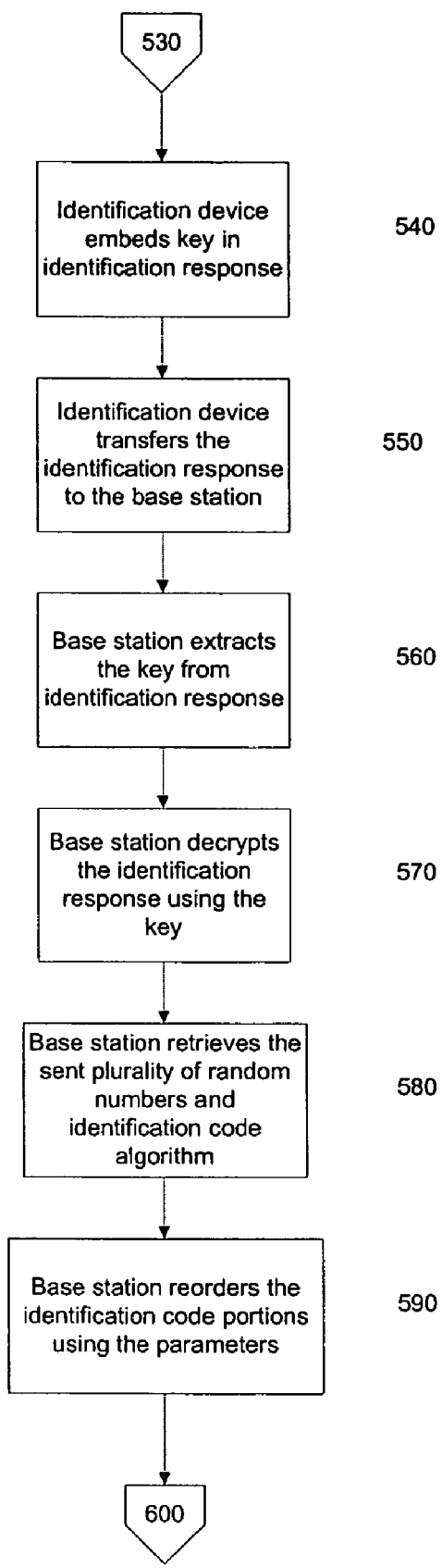
Figure 4D:
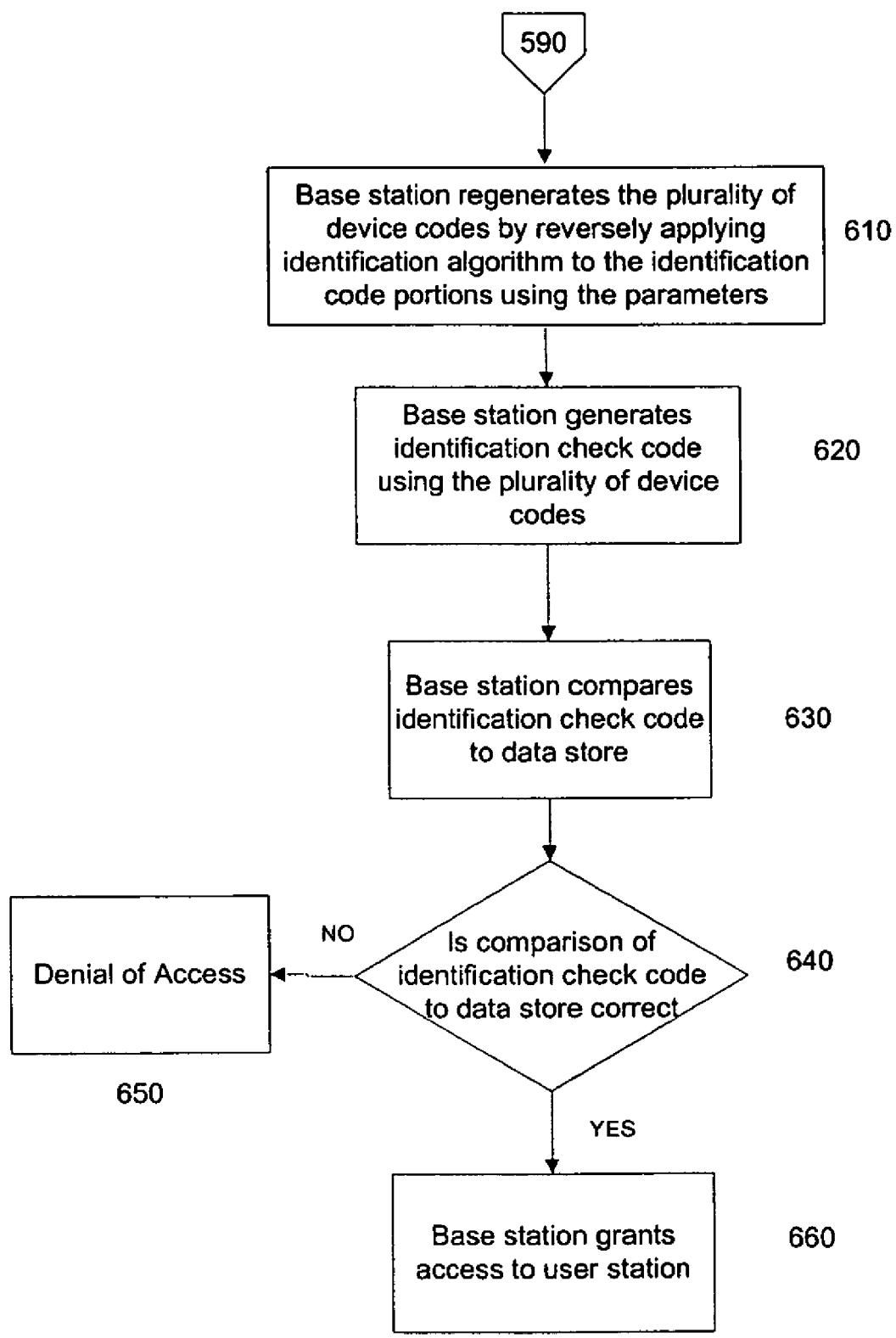

An example of a method of a user being authenticated using the identification system 1 described in FIG. 2A will now be described with reference to FIGS. 3A to 3C.

In particular, at step 300 the user couples the identification device 10 to the user station 30. At step 305 the user station 30 transfers an access request 40 to the base station 20.

At step 310, the base station 20 compares the access request 40 to data in the data store 22. At step 315, the base station 20 determines the success of the comparison. If the comparison was unsuccessful, the base station 20 denies access to the user station 30 at step 320. If the comparison was successful, the method continues on to step 325.

At step 325, the base station 20 generates an identification request 50 including an identification code algorithm and plurality of parameters. Preferably the parameters are random numbers used by the identification device 10 for generating a plurality of identification code portions, and for ordering the plurality of identification code portions into a string to generate an identification code.

At step 330, the base station 20 encrypts the identification request 50 using the base station's encryption module 23, and at step 335 the base station 20 transfers the identification request 50 to the identification device 10, via the user station 30.

At step 340, the identification device 10 decrypts the identification request 50 using the identification device's decryption module 14. At step 345, the identification device 10 generates an identification response 60. The identification response 60 includes an identification code. The identification code is generated using the received identification code algorithm, the plurality of device codes, and the plurality of parameters.

At step 350, the identification response 60 is encrypted using the identification device's encryption module 13 and at step 355 the identification device 10 transfers the identification response 60 to the base station 20, via the user station 30.

At step 360, the base station 20 decrypts the received identification response 60 including the identification code. At step 365, the base station 20 reversely applies the sent identification code algorithm using the identification code and the sent plurality of parameters so as to determine the identification device's plurality of device codes. The plurality of parameters are used to reorder the identification code and also to regenerate the device codes.

At step 370, the base station 20 generates an identification check code using the determined plurality of device codes. At step 375, the base station 20 compares the generated identification check code to data in the data store 22. At step 380, the base station 20 determines the success of the comparison. If the comparison is unsuccessful, the base station 20 denies access at step 385. If the comparison is successful, the base station 20 grants access to the user using the user station 30 at step 390.

A more detailed example of the method described in FIGS. 3A to 3C will now be described with reference to FIGS. 4A to 4D.

In particular, at step 400 the user couples the identification device 10 to the user station 30. The identification device 10 may include a coupling element 15 which couples with an external interface 35 such as a user station port. The port 35 may be a universal serial bus (USB), used to couple to the identification device's coupling element 15. Accordingly, the identification device 10 preferably includes USB/USB2 communications compatibilities. Alternatively, the identification device 10 may include other forms of coupling elements 15 which could be used to couple to other ports 35 such as parallel ports, serial ports, firewire, RS232, RS485 and the like. Optionally, the identification device 10 may include more than one coupling element 15 allowing the identification device 10 to be used on variety of user stations 30 that includes various types of ports 35.

At step 410, the identification device 10 recognises that the identification device 10 has been coupled to the user station 30, and therefore installs driver software on the user station 30. It will be appreciated that the driver software may be installed each time the identification device 10 is coupled to the user station 30, as will be described in more detail later. Alternatively, it will also be appreciated that the driver software may only require being installed the initial time the identification device 10 is coupled to the user station 30. The driver software is used by the user station 30 to control the data transfer between the base station 20 and the identification device 10 via the user station 30, and may also be used by the user station 30 to control the identification device 10.

At step 420 the user station 30 transfers an access request 40 to the base station 20. The access request 40 includes a user's username and a password. For example, the user may open a financial institution's web page on the internet using the user station 30. The web page prompts the user for the username and the password. An access request 40 including the username and the password is then transferred to the base station 20. It will be appreciated that the access request 40 including the username and the password may be encrypted.

At step 430 the base station 20 compares the received access request 40 to data in the data store 22, and at step 440, the base station 20 determines the success of the comparison. For example, the base station 20 may decrypt the access request 40 including the username and the password, and compare the unencrypted user name and password to data in the data store 22. If the comparison is unsuccessful (ie. the unencrypted username and password does not exist in the database) then the base station 20 denies access the user using the user station 30 at step 450. If the comparison is successful, the method moves on to step 460. The base station 20 may transfer data to the identification device 10 indicating the success of the comparison.

At step 460, the base station 20 generates an identification request 50 including an identification code algorithm and plurality of parameters, wherein the plurality of parameters are preferably random values. The identification code algorithm may include a number of sub-algorithms, wherein each sub-algorithm is applied to an individual device code in the identification device 10, as will be discussed in further detail later. The identification code algorithm uses both the plurality of random values and the device codes to generate an identification code, as will also be discussed in more detail later. The identification code algorithm and the plurality of random numbers are stored in the base station's data store 22 with the associated received access request 40.

The plurality of random numbers are preferably generated by measuring electronic interference (also known as "white noise") so as to generate real random numbers rather than pseudo-random numbers. The identification code algorithm is selected by the base station 20 at random from a plurality of identification code algorithms stored in the base station's data store 22. Similarly, the base station 20 may select the identification code algorithm from the plurality of identification code algorithms using a random number.

At step 470, the base station 20 encrypts the identification request 50 using the base station's encryption module 23 and a key stored in the base station store 22. The identification request 50 may be unencrypted using a similar key stored in the identification device store 12. At step 480 the base station transfers the identification request 50 to the identification device 10, via the user station 30.

At step 490, the identification device 10 decrypts the identification request 50 using the identification device decryption module 14. As has been previously indicated, the identification device's decryption module 14 uses a key stored in the identification device store 12 to decrypt the identification request 50.

At step 500, the identification device 10 applies the identification code algorithm to the plurality of device codes to generate an identification code. As earlier indicated, the identification algorithm includes a number of sub-algorithms, wherein each sub-algorithm is applied to the each device code stored in the identification device's store 12. When each sub-algorithm is applied to each respective device code, one of the plurality of the random numbers is used in order to produce a portion of the identification code.

Figure 9:
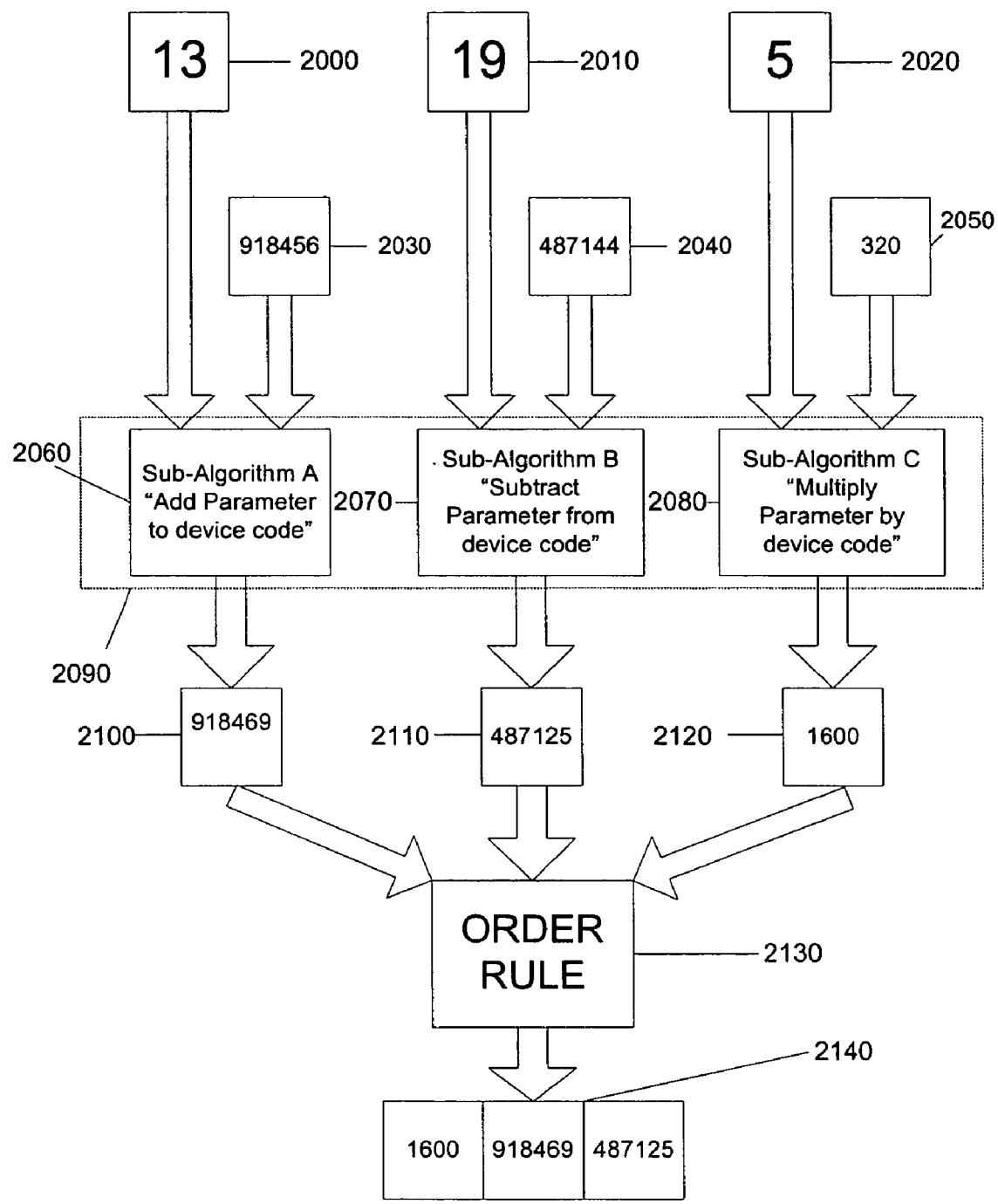
FIG. 9 shows an example of generating of an identification code.

Each sub-algorithm manipulates a respective device code using one of the random numbers from the received plurality of random numbers. For example, as shown in FIG. 9, the first sub-algorithm 2060 is indicative of adding the value of the random number to the value of the device code 2030. Other forms of manipulation, which a sub-algorithm may be indicative of, may include multiplying or subtracting one of the random numbers from the device code, as shown in FIG. 9. It will be appreciated that these are simplified examples and that more complex sub-algorithms are possible.

At step 510, the identification code is generated by concatenating each generated identification code portion to other identification code portions using an order rule and the values of the received plurality of random numbers, such as to generate an identification code.

For example, as shown in FIG. 9, the plurality random numbers 2000, 2010, 2020 received in the identification request 50 include a first random number 2000 having a value of '13', a second random number 2010 having a value of '19', and a third random number 2020 having a value of '5'. The first random number 2000 is used with the first sub-algorithm 2060 and applied to the first register 2030 including the first device code. The result of the first sub-algorithm 2060 produces a first identification code portion 2100. Similarly, the second and third random numbers 2010, 2020 are used with the second and third sub-algorithms 2070, 2080 and applied to second and third registers 2040, 2050 respectively, producing the second and third identification code portions 2110, 2120.

The identification device 10 includes an order rule 2130, which for example specifies that the identification code portions 2100, 2110, 2120 are to be concatenated together in an ascending order of the value of each random numbers 2000, 2010, 2020 applied. Therefore, the third random number 2020 with a value of five is the smallest, followed by the first random number 2000 with a value of thirteen, and then the second random number 2010 with a value of nineteen. Therefore, the order rule 2130 generates an identification code 2140 by concatenating the identification code portions 2100, 2110, 2120 which includes the third identification code portion 2100, followed by the first identification code portion 2110, followed by the second identification code portion 2120, as shown in FIG. 9. It will be appreciated that other order rules 2130 could be applied, for example, concatenating the identification code portions 2100, 2110, 2120 in descending order.

At step 520, the identification device 10 generates an identification response 60. The identification response 60 includes the generated identification code.

At step 530, the identification response 60 is encrypted using the identification device's encryption module 13. The identification device 10 uses a randomly generated key to encrypt the identification response 60. The identification device 10 may measure electronic interference to generate a random key to be used by the encryption module 13 to encrypt the identification response 60. Typically, the encryption module is a Triple DES encryption module. The encryption module 13 and decryption module 14 may be hardware, software, or a combination of hardware and software.

At step 540, the identification device 10 embeds the generated random key used to encrypt the identification response 60, in the identification response 60. As such, when the base station receives the identification response, the base station extracts the randomly generated key in order to decrypt the identification response 60. However, it will be appreciated that other forms of exchanging the randomly generated key are possible such as using session keys. It is preferable that encrypted data transfer between the identification device 10 and the base station 20 after step 540 use the randomly generated key. For example, if data is transferred after access is granted, the encryption modules 13, 23 and decryption modules 14, 24 use the randomly generated key in order to encrypt and decrypt data transferred.

At step 550, the identification device 10 transfers the identification response 60 to the base station 20, via the user station 30.

At step 560, the base station 20 extracts the random key embedded in the received identification response 60. The base station 20 may extract the random key from the identification response 60 at predetermined locations in the identification response 60.

At step 570, the base station 20 decrypts the received identification response 60 using the base station's decryption module 24 and the extracted random key. Typically, the base station's decryption module 24 is a software module however it will be appreciated that the decryption module 24 may be a Triple DES decryption module. The decryption module 24 may be hardware, software, or a combination of hardware and software. The decrypted identification response 60 includes the identification code generated by the identification device 10.

At step 580, the base station 20 retrieves from the base station's data store 22 the plurality of random numbers sent to the identification device 10 in the identification request 50. At step 590, the base station 20 uses the plurality of random numbers to reorder the identification code portions. Therefore, the base station 20 determines, using the plurality of random numbers, which identification code portion was generated for which device code in the identification device 10.

At step 600, the base station 20 retrieves from the base station's data store 22 the sent identification code algorithm. At step 610, the base station 20 reversely applies each sub-algorithm to the determined identification code portions using the plurality of random numbers. Thus, by reversely applying the sub-algorithms, the plurality of device codes, stored in the identification device 10, are re-generated by the base station.

At step 620, the base station 20 generates an identification check code using the re-generated device codes. The base station may include an identification code converter (not shown) that uses the re-generated device codes to produce an identification check code. The identification code converter may be any one or combination of a software program or hardware to perform the task of converting the plurality of re-generated device codes to an identification check code 18.

Preferably the identification check code includes less digits compared to the plurality of device codes such that the base station's data store 22 does not have to record large numbers, and slow down the comparison process performed in step 630. It will be appreciated that the plurality of regenerated device codes are purged from the base station's memory 22 such that the only record of the plurality of device codes in the identification system 1 is in the identification device 10.

At step 630, the base station 20 compares the generated identification check code to data in the data store 22. The comparison includes comparing that the identification check code matches the associated user name and password compared earlier at step 430.

At step 640, the base station 20 determines the success of the comparison of the identification check code. At step 650, if the comparison is unsuccessful, the base station 20 denies access. If the comparison is successful, the base station 20 grants access to the user using the user station 30 at step 660. Access may be granted by creating a secure sockets layer (SSL) link between the base station 20 and user station 30.

Figure 2B:
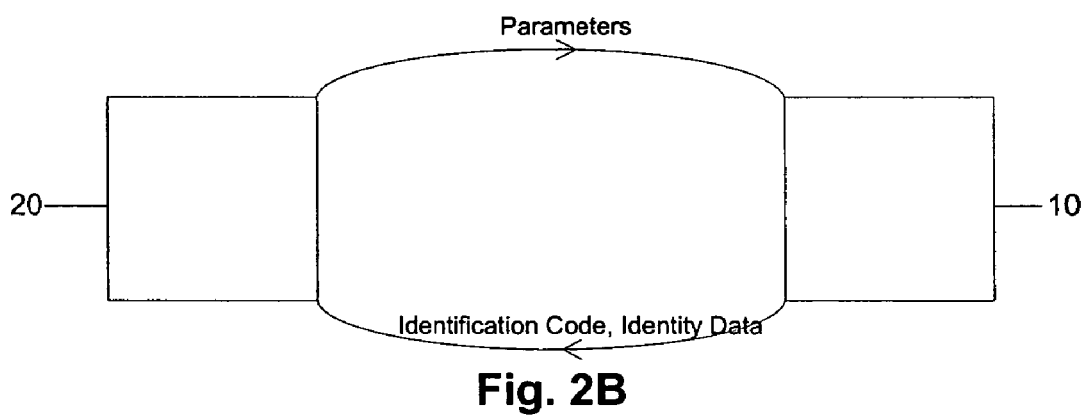

Another example of an identification system will now be described with reference to FIG. 2B.

In particular, the base station includes a store 22 including at least one parameter, and a lookup table including identity data associated with a plurality of identification code algorithms. The identification device 10 includes a store 12 including code data and at least one algorithm. The base station 20 transfers the at least one parameter to the identification device 10. The identification device 10 transfers a generated identification code and identity data to the base station 20 to be authenticated.

Figure 5A:
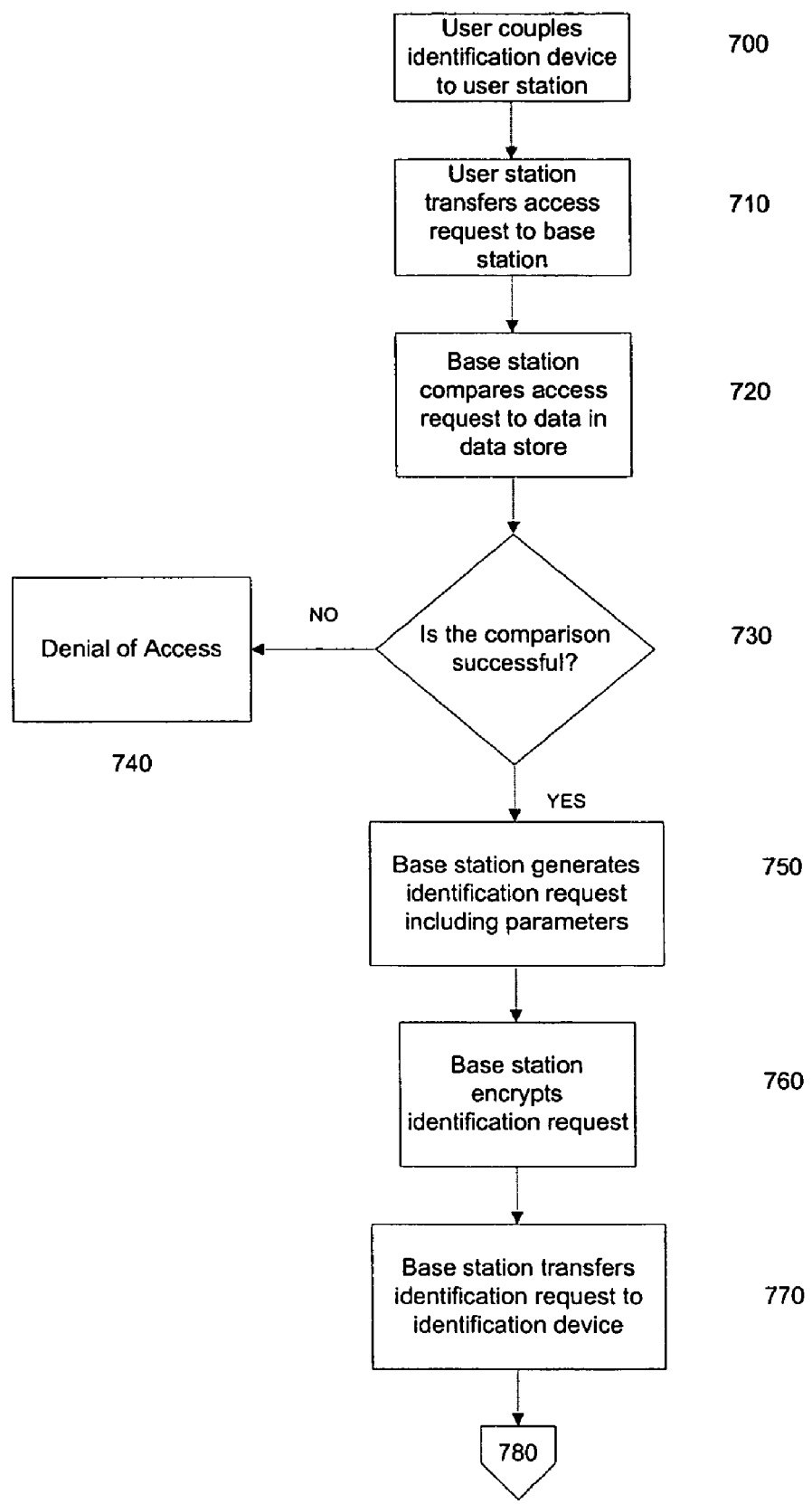
FIG. 5A to 5C shows an example flowchart outlining a method of authenticating a user using the identification system of FIG. 2B.
Figure 5B:
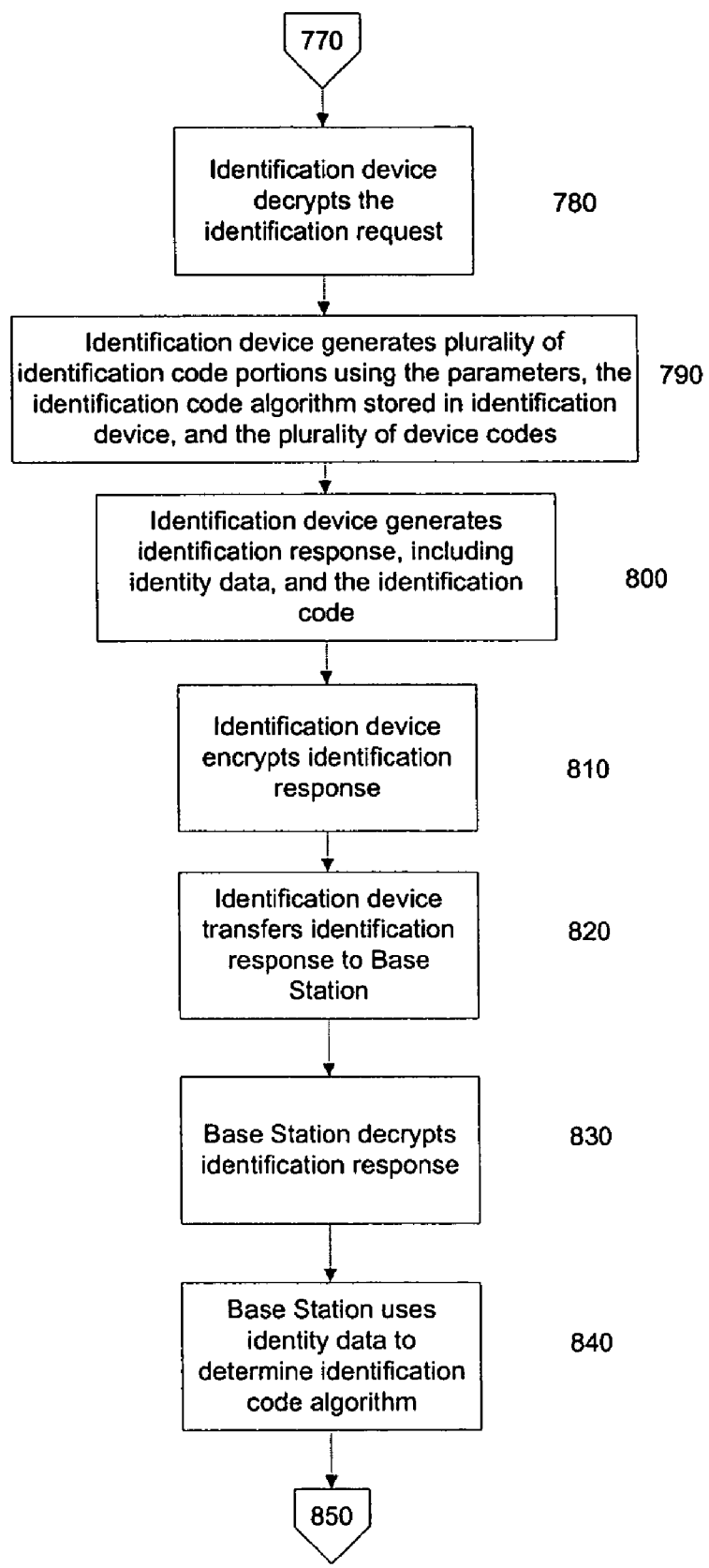
Figure 5C:
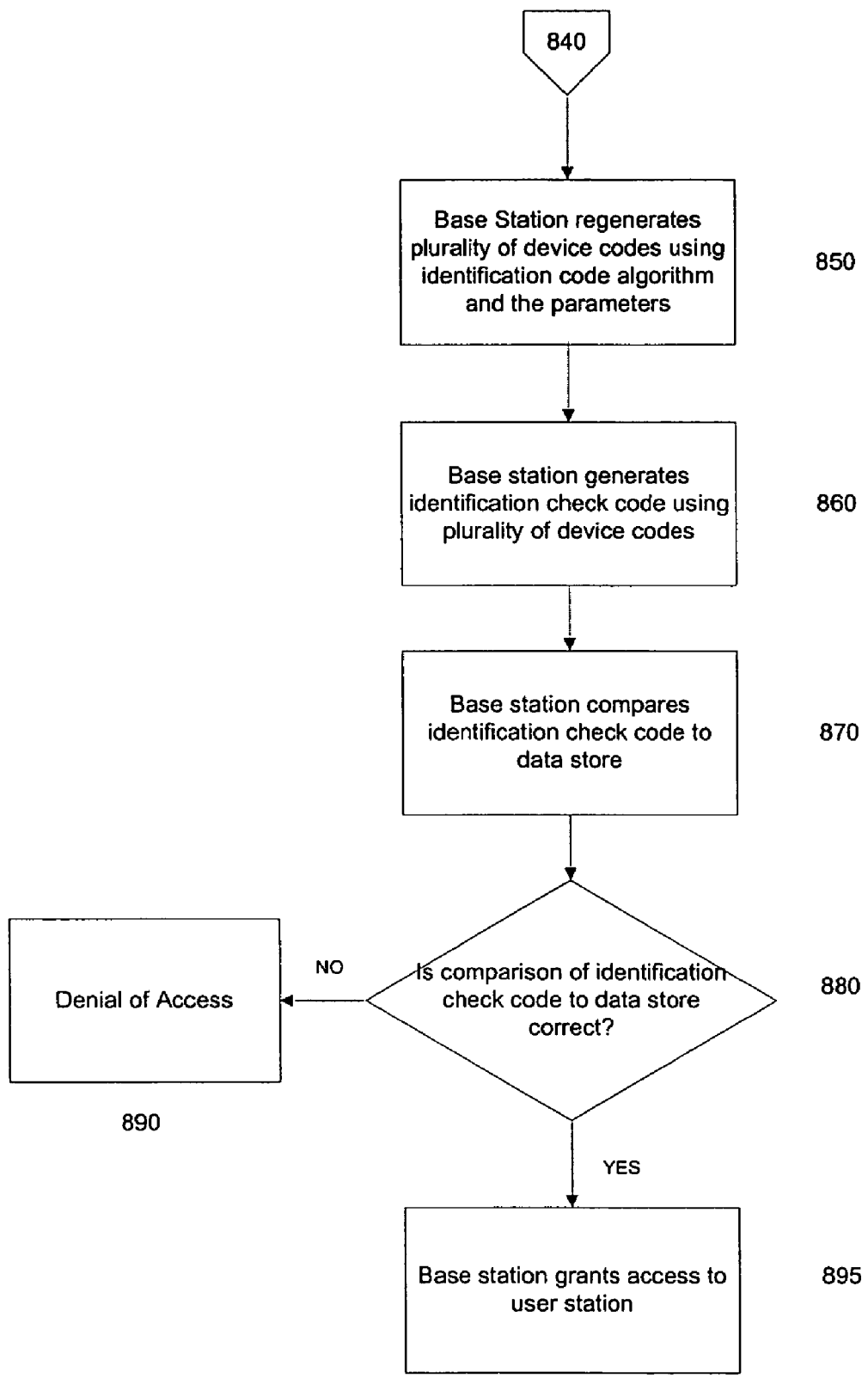
Figure 6A:
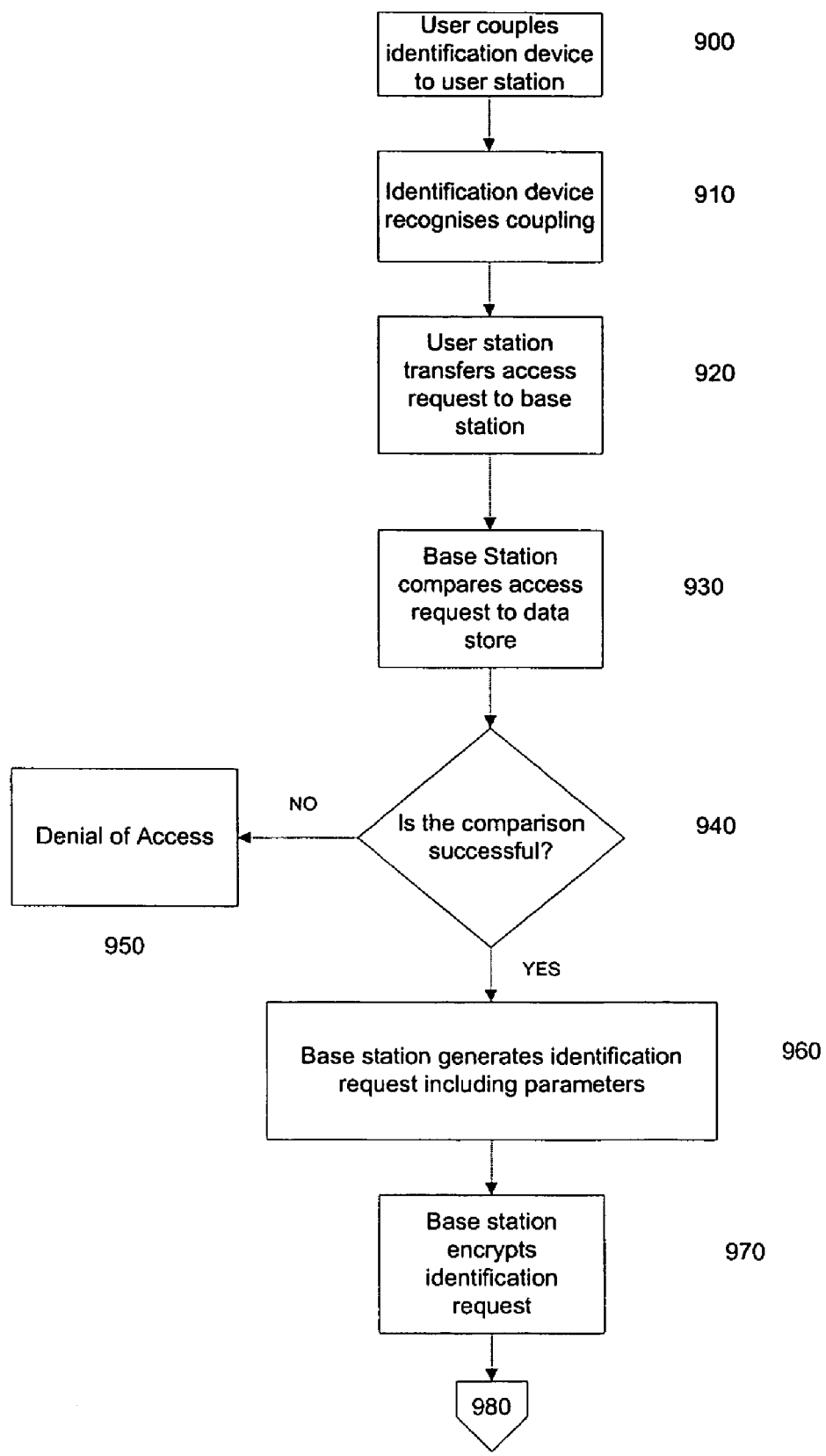
FIG. 6A to 6D shows a more detailed example of the method shown in FIGS. 5A to 5C.
Figure 6B:
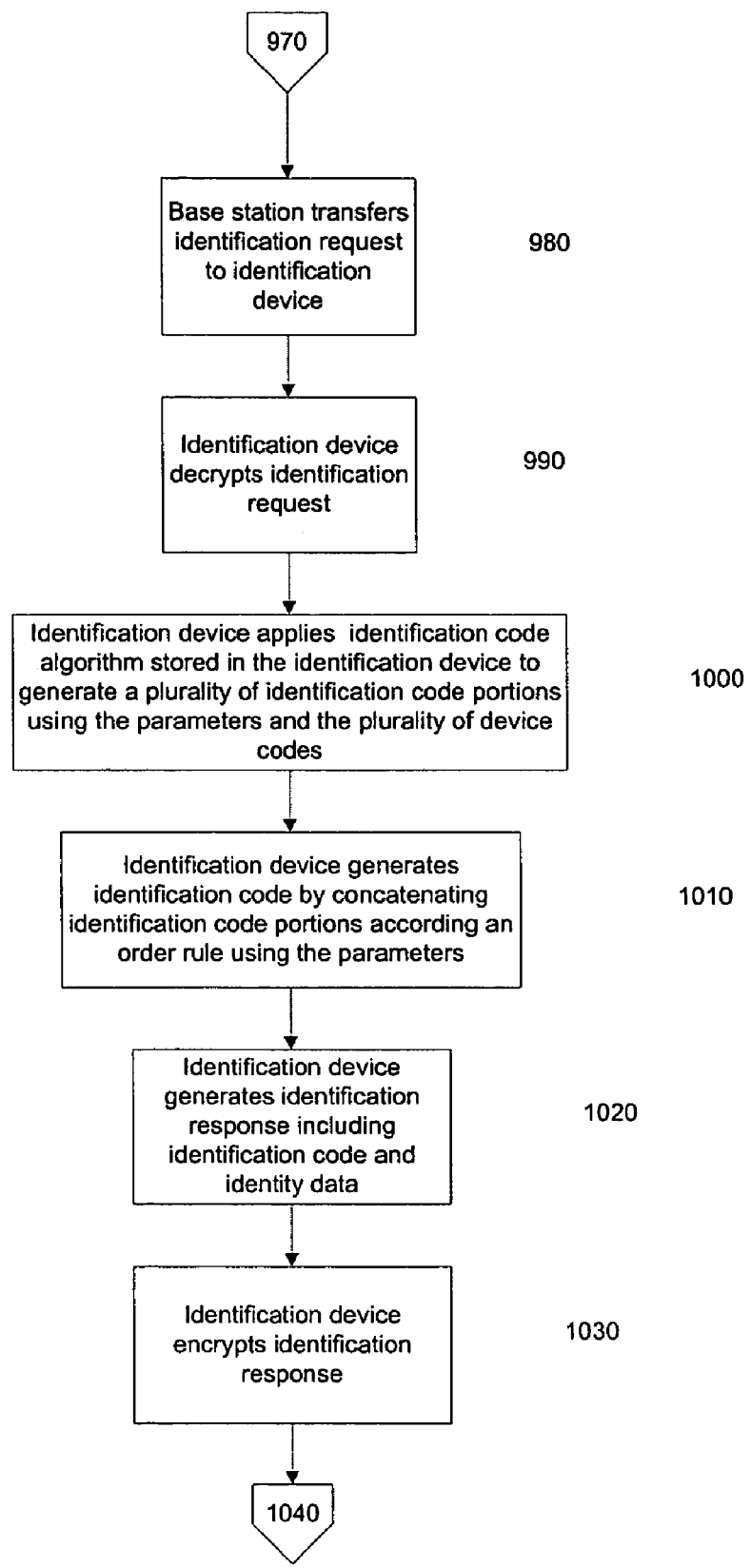
Figure 6C:
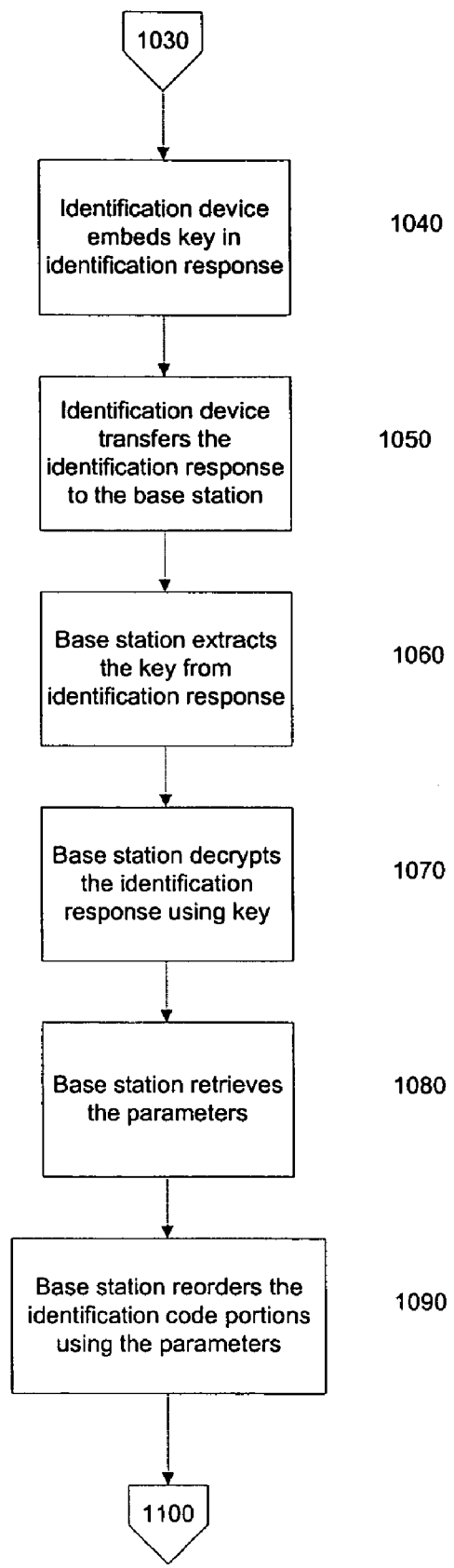
Figure 6D:
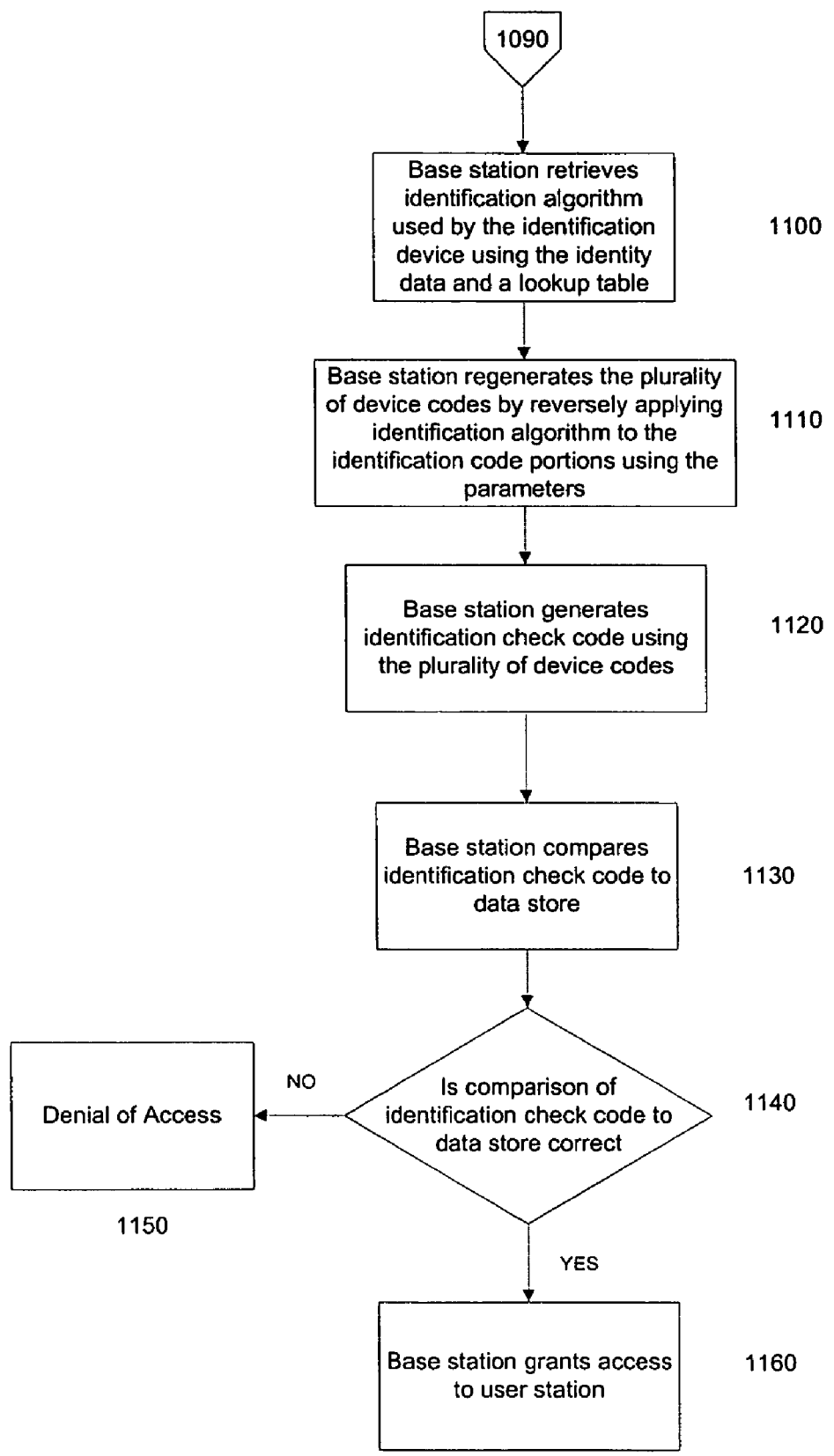
Figure 7A:
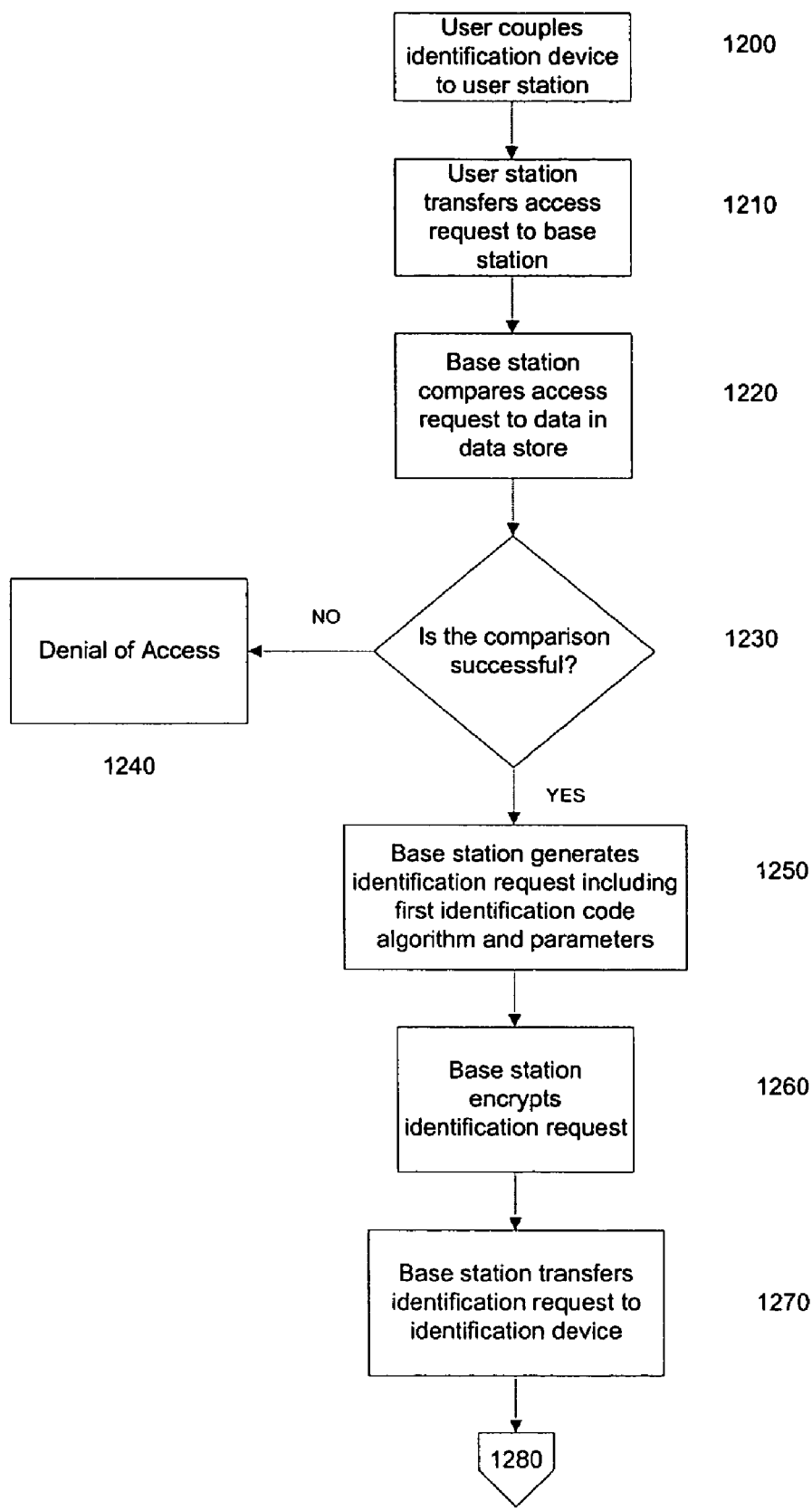
FIG. 7A to 7D shows an example flowchart outlining a method of authenticating a user using the identification system of FIG. 2C.
Figure 7B:
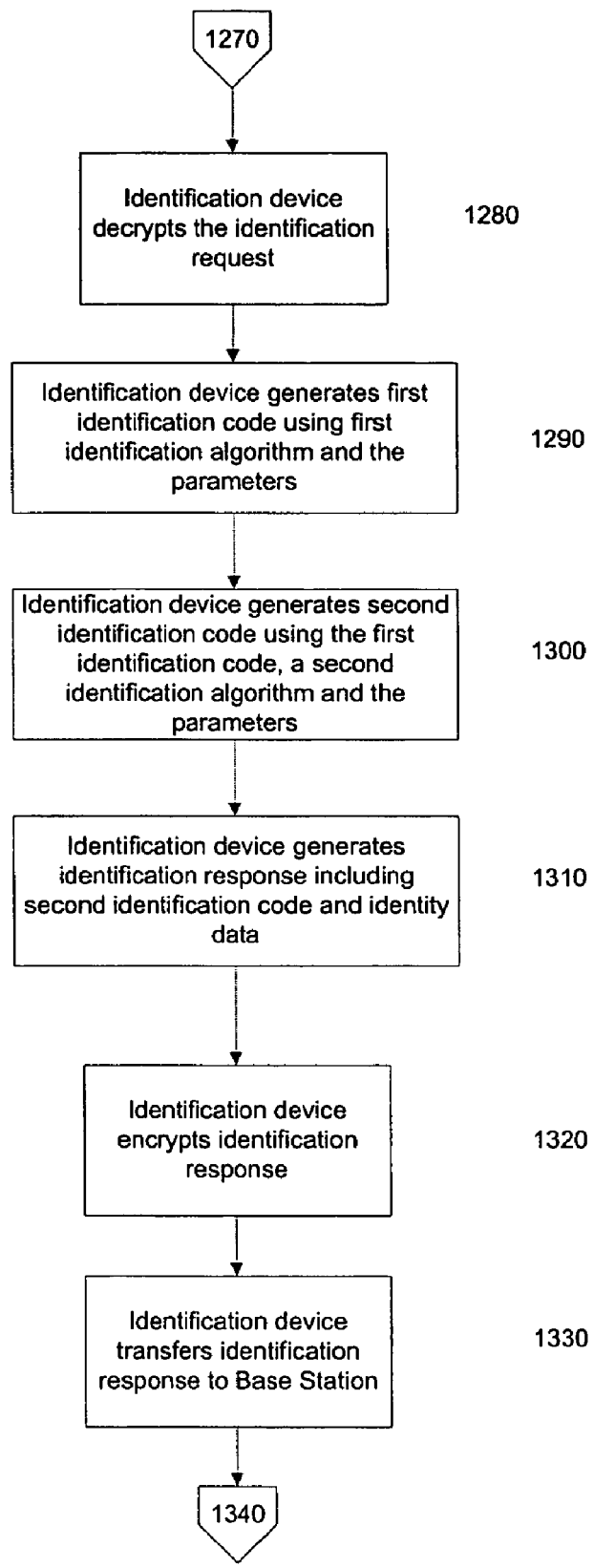
Figure 7C:
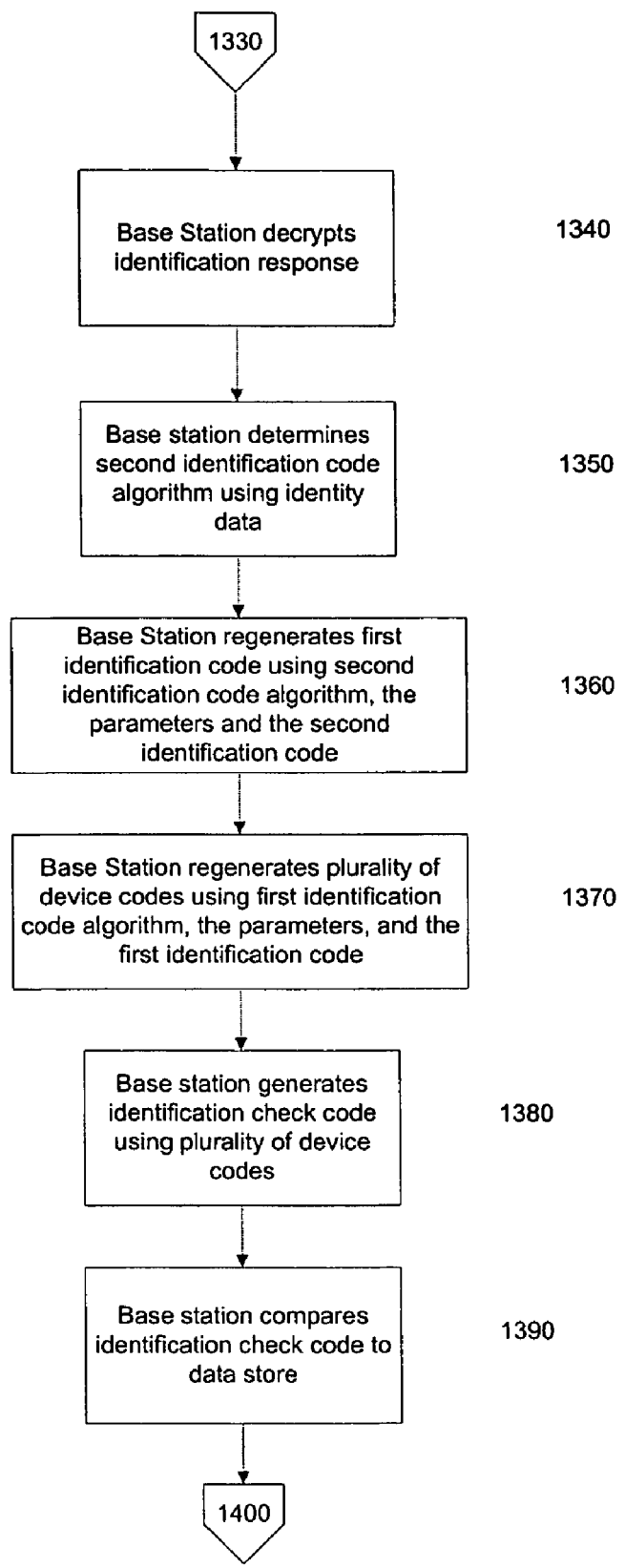
Figure 7D:
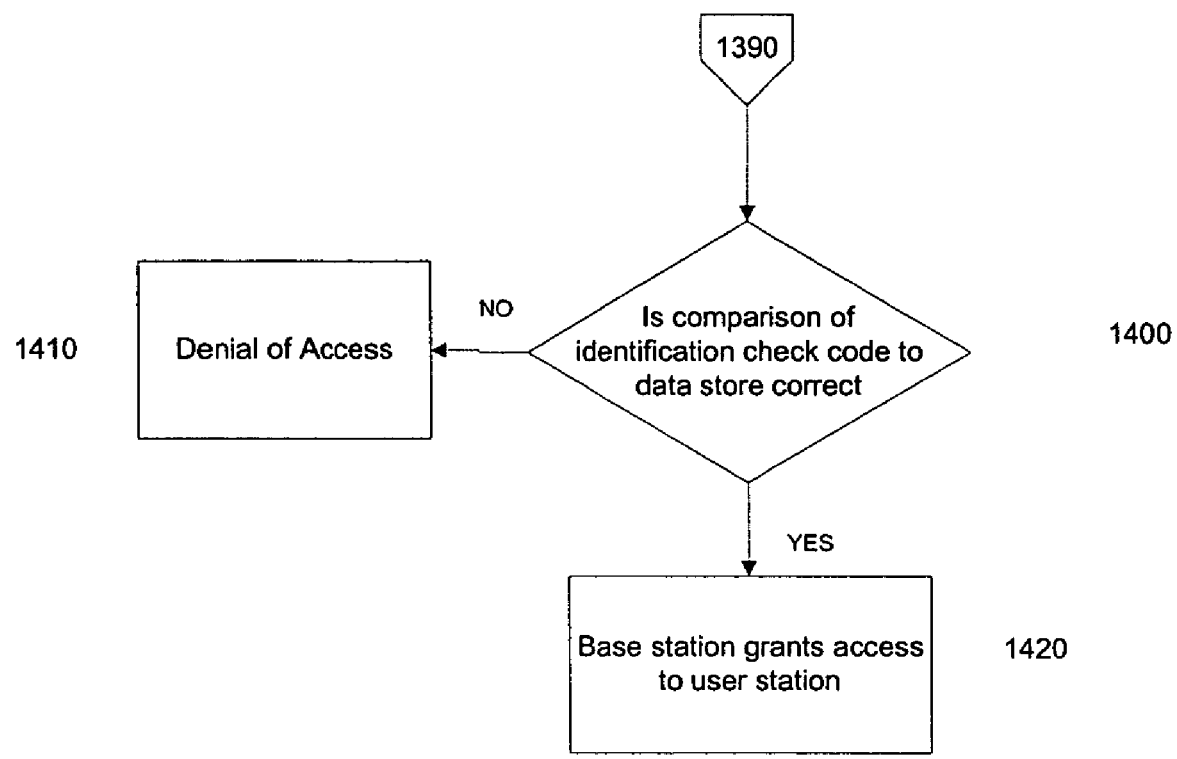
Figure 8A:
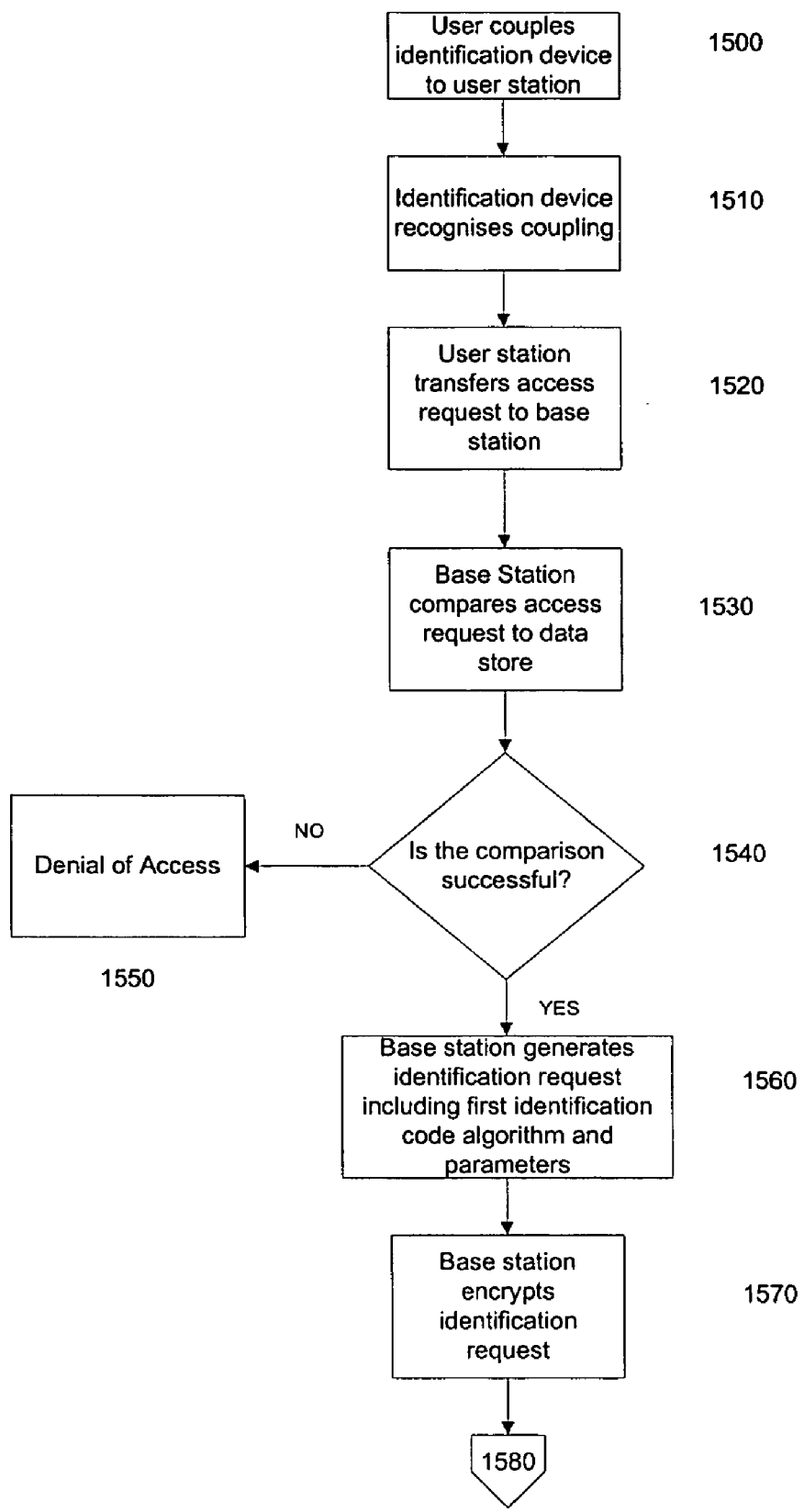
FIG. 8A to 8E shows a more detailed example of the method shown in FIGS. 7A to 7D.
Figure 8B:
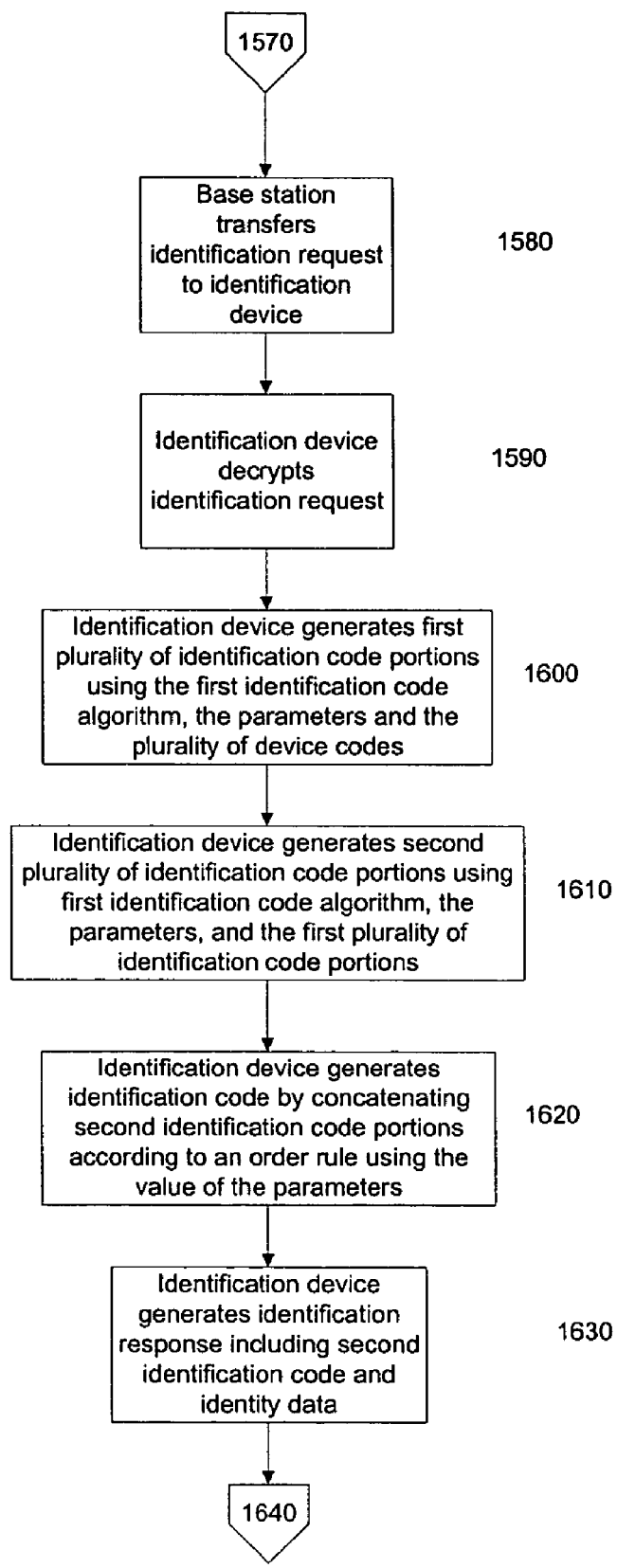
Figure 8C:
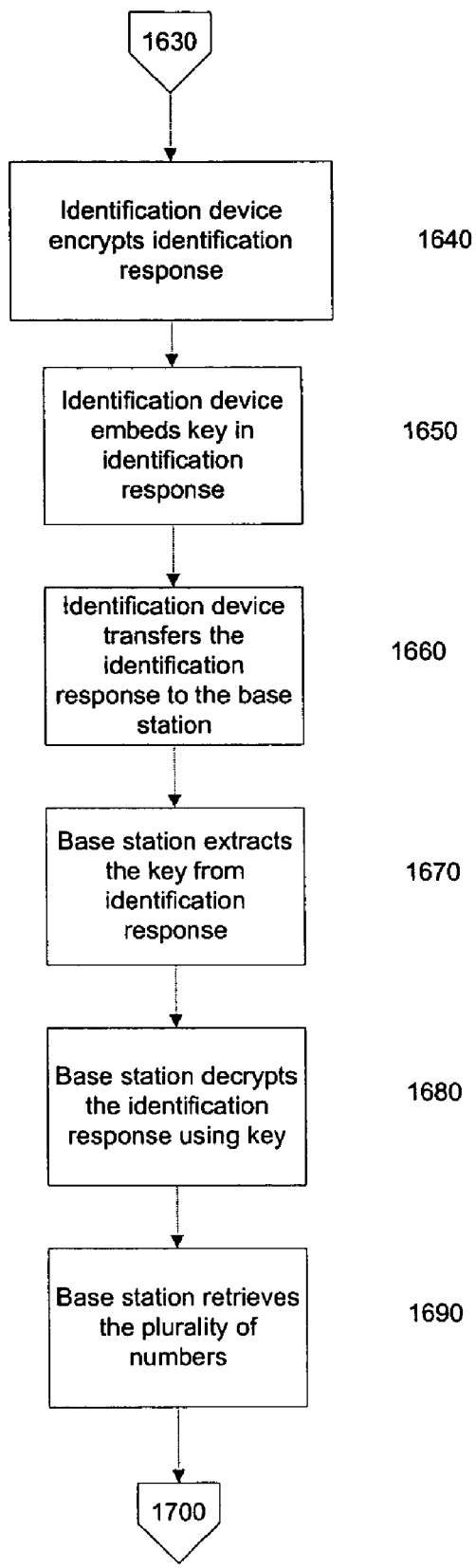
Figure 8D:
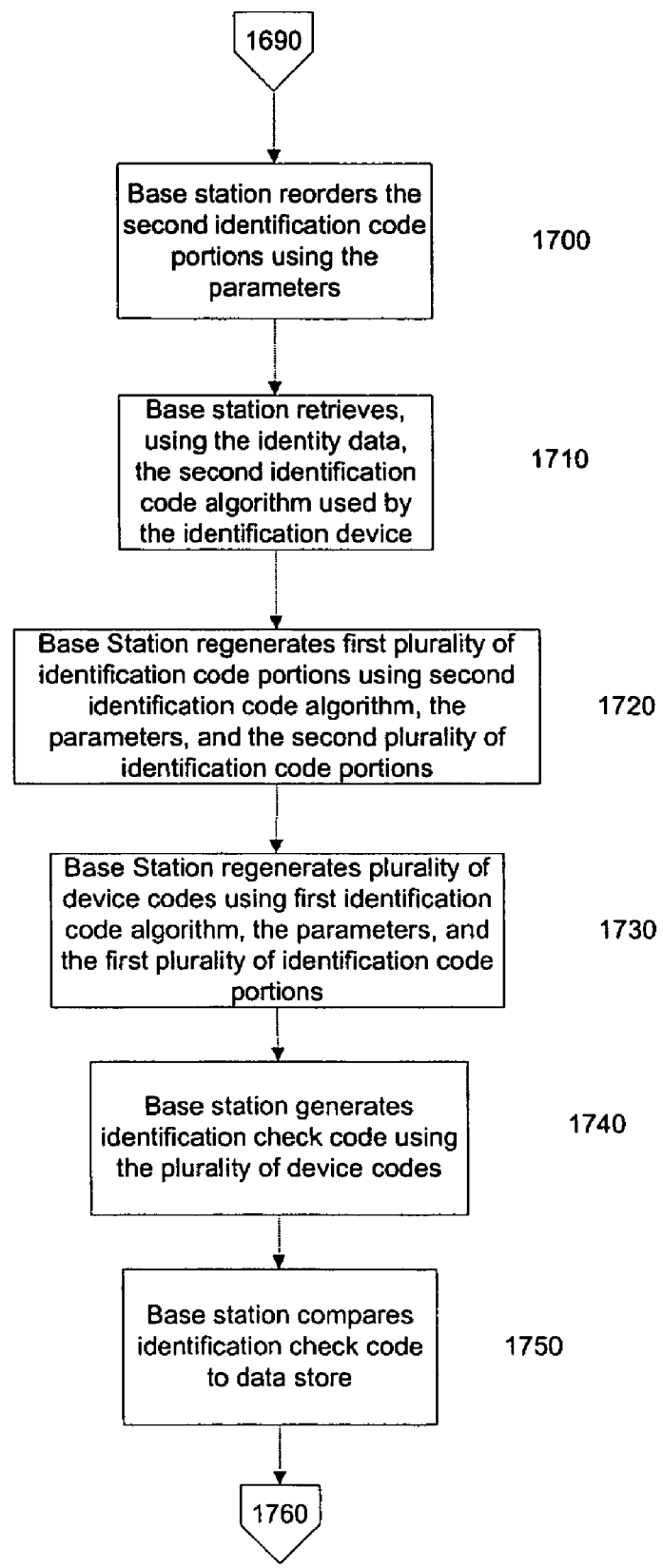
Figure 8E:
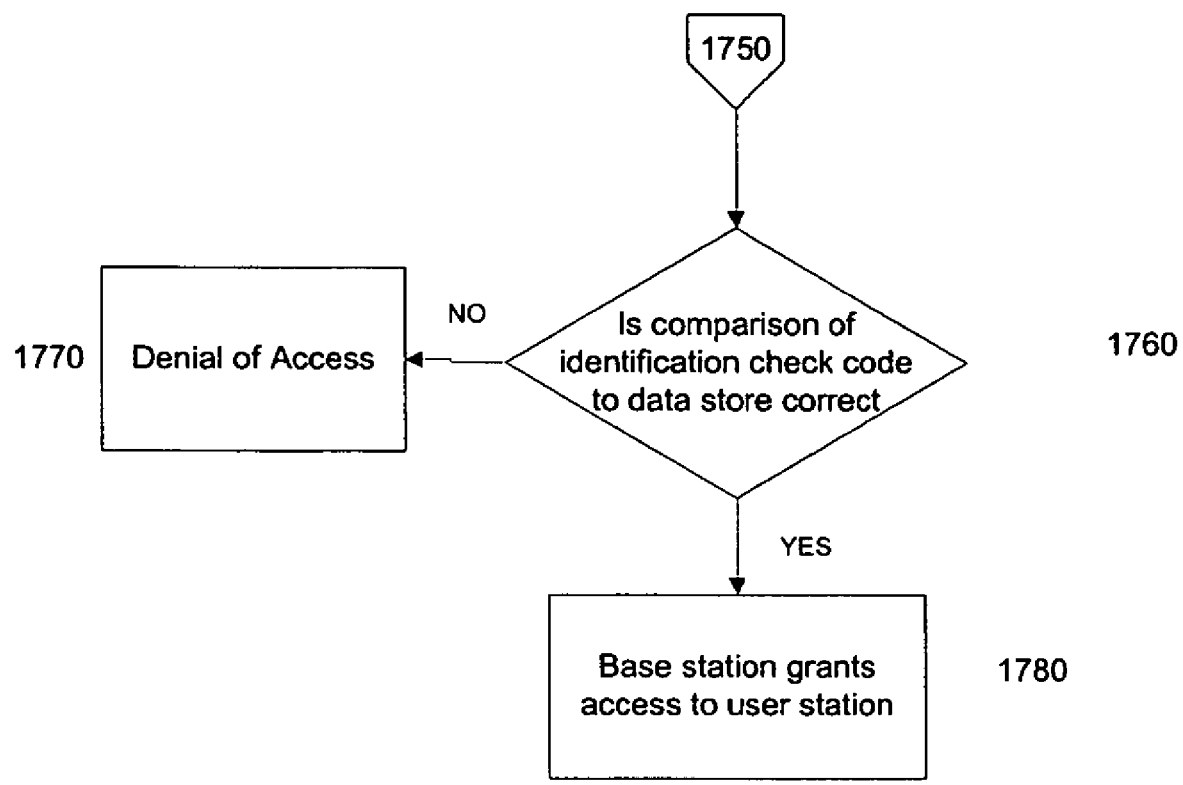

An example of a method of a using the identification system described in FIG. 2B will now be described with reference to FIGS. 5A to 5C.

In particular, at step 700 the user couples the identification device 10 to the user station 30. At step 710 the user station 30 transfers an access request 40 to the base station 20.

At step 720, the base station 20 compares the access request 40 to data in the data store 22. At step 730, the base station 20 determines the success of the comparison. If the comparison was unsuccessful, the base station 20 denies access to the user station 30 at step 740. If the comparison was successful, the method continues on to step 750.

At step 750, the base station 20 generates an identification request 50 including a plurality of random numbers. At step 760, the base station 20 encrypts the identification request 50 using the base station's encryption module 23, and at step 770 the base station 20 transfers the identification request 50 to the identification device 10, via the user station 30.

At step 780, the identification device 10 decrypts the identification request 50 using the identification device decryption module 14. At step 790, the identification device 10 generates an identification code. The identification code is generated using the identification code algorithm stored in the identification device store 12. The identification code algorithm stored in the identification device 10 uses the plurality of device codes, and the received plurality of random numbers to generate the identification device code.

At step 800, the identification device 10 generates an identification response 60 including the identification code and identity data. At step 810, the identification response 60 is encrypted using the identification device's encryption module 13 and at step 820 the identification device 10 transfers the identification response 60 to the base station 20, via the user station 30.

At step 830, the base station 20 decrypts the received identification response 60 including the identification code and identity data. At step 840, the base station 20 uses the identity data to determine, using data stored in the data store 22, the identification code algorithm used by and stored in the identification device 10.

At step 850, the base station 20 reversely applies the determined identification code algorithm using the identification code and the sent plurality of random values to determine the identification device's plurality of device codes.

At step 860, the base station 20 generates an identification check code using the determined plurality of device codes. At step 870, the base station 20 compares the generated identification check code to data in the data store 22. At step 880, the base station 20 determines the success of the comparison. At step 890, if the comparison is unsuccessful, the base station 20 denies access. If the comparison is successful, the base station 20 grants access to the user using the user station 30 at step 895.

A more detailed example of the method described in FIGS. 5A to 5C will now be described with reference to FIGS. 6A to 6D.

In particular steps 900 to 950 are performed similarly to steps 400 to 450.

At step 960, the base station 20 generates an identification request 50 including a plurality of random numbers. The plurality of random numbers are used by the identification device 10 in the identification code algorithm to generate a plurality of identification code portions. The plurality of random numbers may also be used with the order rule to determine an order which the plurality of generated identification code portions are to be concatenated, as previously described. The plurality of random numbers are generated and stored in the base station's data store 22 prior to being sent to the identification device 10.

Steps 970 to 990 are performed similarly to steps 470 to 490.

At step 1000, the identification device 10 applies the stored identification code algorithm to the plurality of device codes to generate an identification code. The plurality of random numbers are also used by the identification code algorithm, as shown in FIG. 9.

Step 1100 is performed similarly to step 510.

At step 1020, the identification device 10 generates an identification response 60. The identification response 60 includes the generated identification code and identity data. The identity data includes a device identity to uniquely identify the identification device 10. The identity data may also include a grouping number and a version number. The grouping number may be used by the base station 20 to determine the identification code algorithm stored in the identification device 10. The version number may be indicative of the version of the identification device 10. For example version '1.0' may include two hundred and fifty six device codes, whereas version '1.1' may include five hundred and twelve device codes.

Steps 1030 to 1060 are performed similarly to steps 530 to 560.

At step 1070, the base station 20 decrypts the identification response 60, similarly to step 570. The decrypted identification response 60 includes the identification code and the identity data.

Steps 1080 and 1090 are performed similarly to step 580 and 590.

At step 1100, the base station 20 retrieves, from the base station's data store 22, the identification code algorithm used by the identification device 10. The base station 20 determines the identification code used by the identification device 10 using the received identity data. Thus the identity data is used as a pointer in a lookup table (or matrix) which includes the identification code algorithms for a plurality of identification devices 10.

Once the identification code algorithm is retrieved, using identity data, the base station 20 performs step 1110 to 1160 similarly to step 610 to 660 so as to authenticate the user of the user station 30 and grant access if a successful authentication occurs.

Figure 2C:
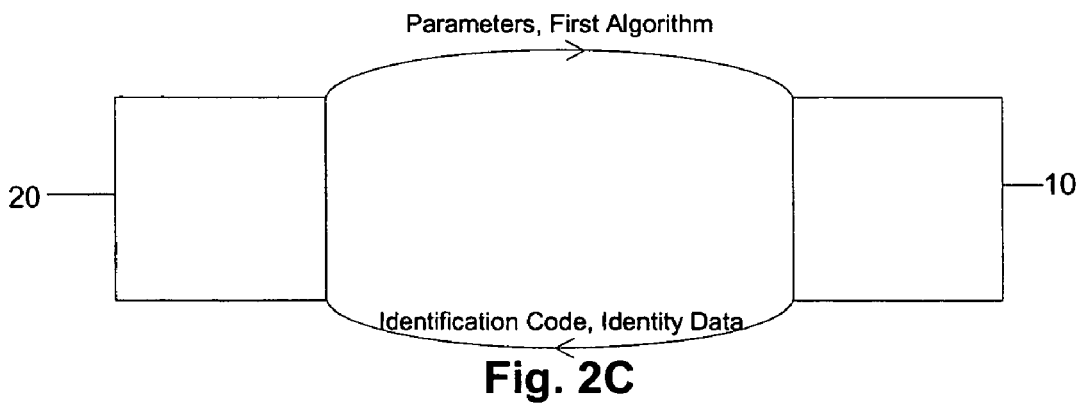

Another example of an identification system will now be described with reference to FIG. 2C.

In particular, the base station 20 includes a store 22 including at least one parameter, at least one first algorithm. The identification device 10 includes a store 12 including code data and at least one second algorithm. The base station 20 transfers the at least one parameter and first algorithm to the identification device 10. The identification device 10 transfers a generated identification code and identity data to the base station 20 to be authenticated.

An example of a method using the identification system described in FIG. 2C will now be described with reference to FIGS. 7A to 7D.

In particular, at step 1200 the user couples the identification device 10 to the user station 30. At step 1210 the user station 30 transfers an access request 40 to the base station 20.

At step 1220, the base station 20 compares the access request 40 to data in the data store 22. At step 1230, the base station 20 determines the success of the comparison. If the comparison was unsuccessful, the base station 20 denies access to the user station 30 at step 1240. If the comparison was successful, the method continues on to step 1250.

At step 1250, the base station 20 generates an identification request 50 including a plurality of random values and a first identification code algorithm. At step 1260, the base station 20 encrypts the identification request 50 using the base station's encryption module 23, and at step 1270 the base station 20 transfers the identification request 50 to the identification device 10, via the user station 30.

At step 1280, the identification device 10 decrypts the identification request 50 using the identification device decryption module 14. At step 1290, a first identification code is generated by applying the first identification code algorithm using the plurality of device codes and received plurality of random numbers. At step 1300, a second identification code is generated by applying the second identification code algorithm, stored in the identification device store 12, using the first identification code and the received plurality of random numbers.

At step 1310, the identification device 10 generates an identification response 60 including the second identification code and the identity data.

At step 1320, the identification response 60 is encrypted using the identification device's encryption module 13 and at step 1330 the identification device 10 transfers the identification response 60 to the base station 20, via the user station 30.

At step 1340, the base station 20 decrypts the received identification response 60 including the identification code. At step 1350, the base station 20 uses the identity data to determine, using data stored in the data store 22, the second identification code algorithm used by the identification device 10.

At step 1360, the base station 20 reversely applies the determined second identification code algorithm using the second identification code and the sent plurality of random values so as to regenerate the first identification code.

At step 1370, the base station 20 reversely applies the first identification code algorithm to the regenerated first identification code algorithm using the plurality of random numbers so as to regenerate the identification device's plurality of device codes.

At step 1380, the base station 20 generates an identification check code using the determined plurality of device codes. At step 1390, the base station 20 compares the generated identification check code to data in the data store 22. At step 1400, the base station 20 determines the success of the comparison. At step 1410, if the comparison is unsuccessful, the base station 20 denies access. If the comparison is successful, the base station 20 grants access to the user using the user station 30 at step 1420.

A more detailed example of the method described in FIGS. 7A to 7D will now be described with reference to FIGS. 8A to 8E.

In particular, steps 1500 to 1550 are performed similarly to steps 400 to 450.

At step 1560, the base station 20 generates an identification request 50 including the first identification code algorithm and the plurality of random numbers. The first identification code algorithm is selected randomly from the plurality of first identification code algorithms stored in the data store 22.

Steps 1570 to 1590 are performed similarly to steps 470 to 490.

At step 1600, the identification device 10 applies the first identification code algorithm to the device codes using the plurality of random numbers to generate a plurality of first identification code portions.

At step 1610, the identification device 10 applies the second identification code algorithm to generate, using the plurality of first identification code portions and the plurality of random numbers, the second plurality of identification code portions. It will be appreciated that the first and second algorithms are two segments of a total algorithm that is applied to the device codes, as will be described in more detail later.

Step 1620 is performed similarly to step 510 except the second plurality of identification code portions are concatenated to generate the identification code.

At step 1630, the identification device 10 generates an identification response 60. The identification response 60 includes the generated identification code and identity data. The identity data includes a device identity and may include a version number, and a grouping number, as has been described in previous examples.

Steps 1740 to 1800 are performed similarly to steps 530 to 590.

At step 1710, the base station 20 retrieves, from the base station's data store 22, the second identification code algorithm used by the identification device 10. The base station 20 determines the identification code algorithm used by the identification device 10 using the received identity data. Thus the identity data is used as a pointer to a lookup table (or matrix) which includes the identification code algorithms for a plurality of identification devices 10.

At step 1720, the base station 20 reversely applies the retrieved second identification code algorithm using the received second plurality of identification code portions and the sent plurality of random numbers so as to regenerate the first identification code.

At step 1730, the base station reversely applies the retrieved first identification code algorithm to the regenerated first identification code so as to regenerate the plurality of device codes.

Steps 1740 to 1780 are performed similarly to steps 620 to 660 so as to authenticate the user of the user station 30 and grant access if a successful authentication occurs.

It is preferable that an identification device distributor distributes the identification devices 10 to the base stations 20. The distributor performs a distribution method including loading systemic components including databases and software required to support the identification system 1 onto one or more base stations 20, loading systemic components required to support the particular base stations 20 onto a identification system 1 central site computer and supplier central databases, custom tailoring the relevant base station software/systems to accommodate the new identification information requirements, e.g. the customer system, the internet gateway system, etc., custom tailoring the relevant base station databases to accommodate the new identification information requirements, establishing relevant support procedures at the base station offices and branches, and, performing QA on all procedures and systems affected.

It is preferable that an ongoing operational process occurs between the identification device distributor and each base station 20 included in the identification system 1. The ongoing operational processes that provide support for the identification system 1 are expected to be conducted daily by the identification device distributor and each base station 20 on a one-on-one basis. Typically such processes would include supply of the physical identification device 10 stocks by the identification device distributor to the relevant base station 20, registering the identification devices 10 sent onto the supplier's central databases, registering the identification devices 10 received onto the base station 20 database. It is also perceived that such processes would include distributing the identification devices 10 to the relevant base stations 20 wherein the base station 20 can redistribute the identification devices 10 to their customers, performing daily batch processes to prepare transmission files on each base station 20, transmitting identification device 10 activity data to the identification device 10 supplier's central site computer. Additionally, these processes could include processing on the identification device supplier's central site computer daily identification device 10 activity received from each base station 20 in order to summarise all activities, and, transmitting report files, and warnings to each base station 3.

It is preferable that there is a registration process for a user to obtain an identification device 10. This registration process is only expected to occur once, unless the customer has, damaged, or reported the identification device 10 as lost or stolen.

Typically, a customer visits a base station 20 and applies to use an identification device 10, the base station 20 provides the customer with a "conditions of use" contract, the customer reads the "conditions of use" contract, signs, and returns it to the base station 20. The base station 20 detaches the identification check code tag attached to the identification device 10, and provides the customer with an identification device 10, relevant software such as device drivers or useful software such as internet browsers, and instructions. The base station 20 enters the identification check code 18 printed on the identification check code tag into the customer database, and, the base station 20 then destroys the tag containing the identification check code, as it is no longer required.

An example of a system for authenticating activity data received by the base station 20 will now be described with reference to FIG. 10.

Figure 10:
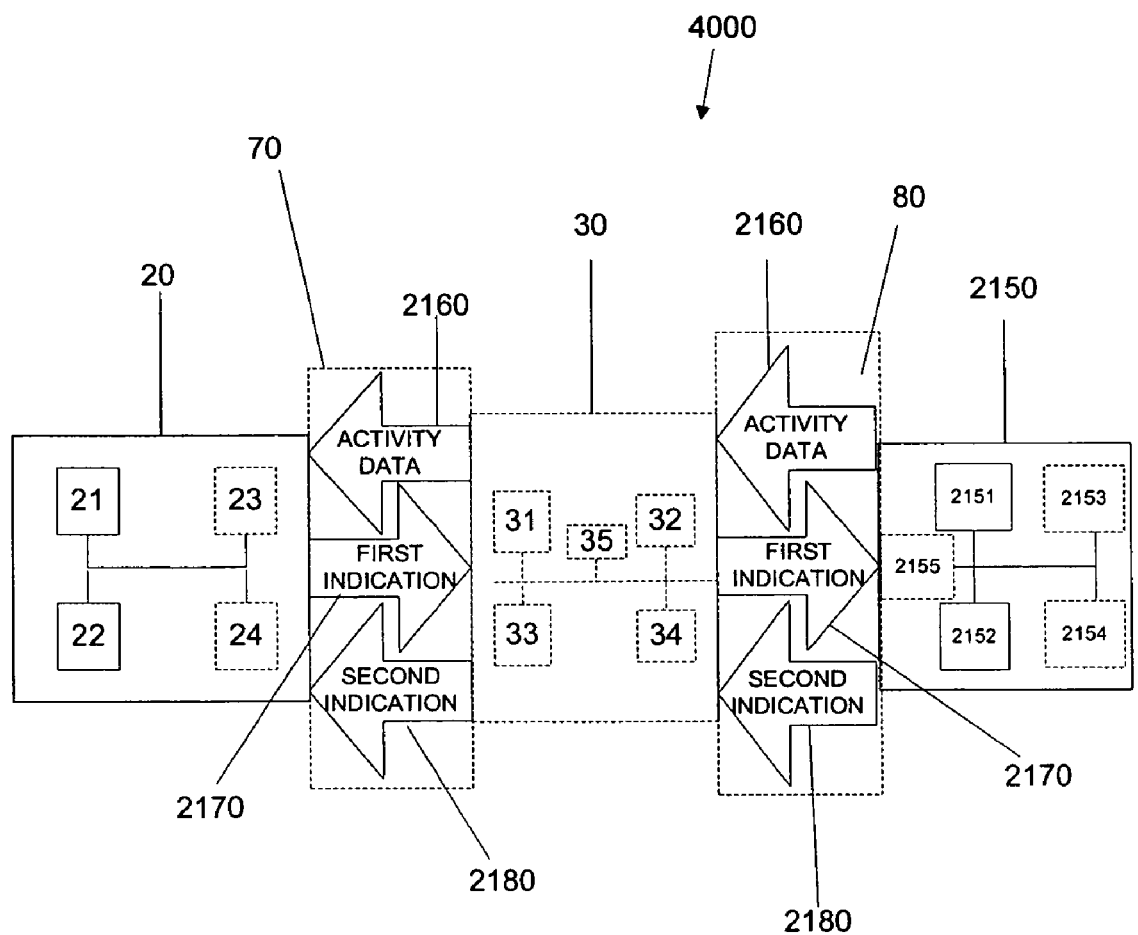
FIG. 10 shows an example of the system for authenticating data.

FIG. 10 shows an example of a system 4000 including a device 2150, a base station 20, optionally a user station 30 and a communications network 70.

The device 2150 and user station 30 may be interconnected via a device coupling element 2165. The base station 20 and user station 30 may be interconnected via the communications network 70. It will be appreciated that as the user station 30 is optional, the base station 20 and device 2150 may be interconnected by the communication network 70. It is preferable that one or more gateways may be positioned on the communication network 70 between each user station 30 and base station 20, interconnecting various networks and different communication protocols.

As has previously been noted, the base station 20 can be a financial institution wherein the user station 30 is a customer performing transactions over a network 70. However, the system is not limited to this use, and can be used in various other applications, as previously described.

The device 2150 is preferably the identification device 10 described earlier. As such, a user can be identified using the identification device 10 and authenticate activity data 2160 received by the base station 20 using the identification device 10. However, it is possible that the identification device 10 can be used for obtaining access to a session, and a separate device 2150 can be used for authenticating activity data 2160 received by the base station 20. The device 2150 may physically couple to a user station 30. However, it will be appreciated that the device 2150 may use wireless communication to transfer and receive data to and from the user station 30.

The device 2150 includes a processor 2151, a store 2152 including code data (also known as device codes) and an order rule. Preferably, the device 2150 includes a coupling element 2155 to optionally couple the device 2150 to the user station 30, an encryption module 2153 and a decryption module 2154. It will be appreciated that parts of the device 2150 may be interchanged with similar parts of the identification device 10 previously described.

Furthermore, it will be appreciated that the device's processor 2151 may be any form of processor suitably programmed to perform the method, as will be described in more detail below.

The base station 20 and user station 30 are similar to those described in the identification system.

Figure 11:
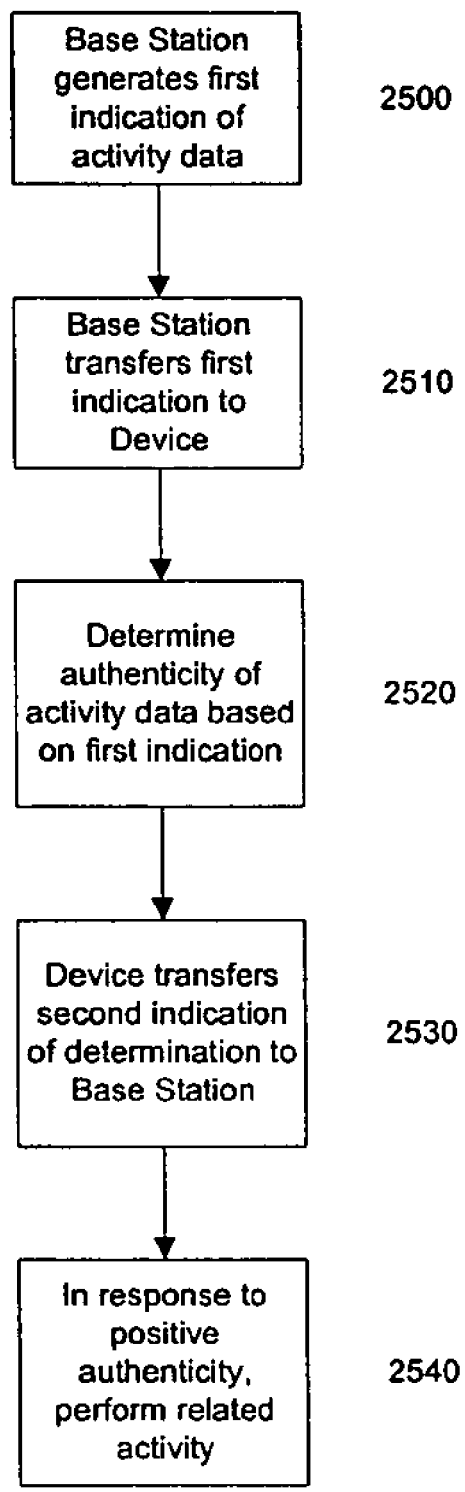
FIG. 11 shows an example flowchart outlining a method of authenticating activity data received by a base station.

An example of a method for authenticating activity data 2160 received by the base station 20 will now be described with reference to FIG. 11.

In particular, at step 2500, the base station 20 generates a first indication 2170 of activity data 2160 received. At step 2510, the base station 20 transfers the first indication 2170 to the device 2150. At step 2520, the device 2150 determines authenticity of the activity data 2160 transferred to the base station 20, based on the first indication 2170. At step 2530, the device 2150 transfers, to the base station 20, a second indication 2180 indicative of the determination. At step 2540, the base station 20 performs the related activity in response to a positive authentication.

The activity data 2160 can be data related to any activity, such as a financial transaction. However, it will be appreciated that any activity may be represented by the activity data 2160. Furthermore, the activity data 2160 received by the base station 20 may be data received from the device 2150 or the user station 30.

A more detailed example of the method described with reference to FIG. 10 will now be described with reference to FIGS. 12A to 12C.

In particular, a user obtains access to information at a base station 20 at step 3000. This step preferably includes the authentication process described in FIGS. 2 to 9 in order to authenticate the user at the user station 30 to the base station 20.

At step 3010, the user inputs activity data 2160 using the user station 30. The activity data 2160 may relate to a financial transaction, which is entered by the user using one or more input devices of the user station 30.

At step 3020, the device 2150 encrypts the activity data 2160. The device 2150 may encrypt the activity data 2160 by the user station 30 transferring the activity data 2160 to the device 2150, wherein the device 2150 subsequently encrypts the activity data 2160. The encryption of the activity data 2160 may be performed similarly to encryption processes described earlier for the identification method and system. Therefore, the device 2150 may encrypt the activity data 2160 using an encryption key that the base station 20 has a stored copy. Optionally, a new encryption key to be used in a subsequent data transfers may be embedded in the activity data 2160, such that the base station 20 may update the current encryption key. This process has previously been described in detail earlier in this document.

At step 3030, the encrypted activity data 2160 is transferred to the base station 20. This transfer may include transferring the encrypted activity data 2160 from the device 2150 to the base station 20 via the user station 30. However, as will be appreciated, it may be possible that wireless communication may be possible such that the encrypted activity data 2160 may bypass the user station 30 and be transferred to the base station 20 directly.

At step 3040, the base station 20 decrypts the encrypted activity data 2160 received from the device 2150, typically via the user station 30. As has previously been mentioned, the base station 20 may use a current encryption key that was updated from previous data received from the device 2150. Preferably, when the activity data 2160 is being decrypted, the embedded encryption key is extracted, and the current encryption key stored by the base station 20 is updated with the extracted encryption key. Any further encryption or decryption performed by the base station 20 uses the updated current encryption key.

At step 3050, the user determines whether an indication of the activity received by base station 20 is required. If the user does not require an indication at this stage, the user continues to enter further activity data 2160 at step 3010. If the user requires an indication of activity data 2160, the method continues to step 3060. Details of the indication of activity data 2160 will be described in more detail below.

At step 3060, the user indicates a request is to be transferred to the base station 20. Generally, the user indicates that the request is to be transferred using the user station 30. This may be in the form of clicking a button provided on a user interface of the user station 30 to request that an indication of the activity data 2160 is required. However, it may be appreciated that a default request is transferred to the base station 20 without the user being required to provide an indication.

At step 3070, the request is transferred to the base station 20. This transfer of the request may be performed by the user station 30, the device 2150, or a combination of both. The request may be encrypted, wherein the base station 20 decrypts the request using the current encryption key.

If the request is encrypted by the device 2150, it is possible that a new encryption key is embedded in the encrypted request, and as such the base station 20 may update the current encryption key after the request is decrypted.

Alternatively, if the request is encrypted by the user station 30, the base station 20 may request that an updated encryption key is sent to the base station 20 from the device 2150, such that the indication of the activity data 2160 is transferred securely. In this case, once the base station 20 receives the request, the base station 20 optionally generates a request for an updated encryption key from the device 2150 at step 3080.

The request is transferred to the device 2150 at step 3085. It will be appreciated that the request may be encrypted using the current encryption key stored by the base station 20. At step 3090 the device 2150 generates a new encryption key and then at step 3095 the device 2150 transfers the new encryption key to the base station 20. The encryption key may be encrypted or it is possible that the encryption key is embedded in the encrypted response. The base station 20 updates the current encryption key with the extracted key received in the response at step 3100. This preferably includes the base station 20 decrypting the response received from the device 2150.

At step 3110, the base station 20 generates a first indication 2170 of the activity data 2160 received by the base station 20. The first indication 2170 may represent at least some of the activity data 2160 received or the entire activity data 2160 received.

The base station 20 then encrypts the first indication 2170 with the current encryption key at step 3120. At step 3130, the base station 20 transfers the encrypted first indication 2170 to the device 2150. This transfer of the encrypted first indication 2170 may occur via the user station 30 if direct transfer of the first indication 2170 to the device 2150 is not possible.

At step 3140, the device 2150 decrypts the encrypted first indication 2170 received from the base station 20.

At step 3150, the device 2150 preferably transfers the first indication 2170 to user station 30, such that the first indication 2170 can be presented to the user at the user station 30. However, it will be appreciated that the first indication 2170 may be presented by the device 2150.

At step 3160, the user station 30 presents the first indication 2170 to user. This may include displaying the first indication 2170 on the user station's display 34. Optionally, the first indication 2170 may include information warning if the first indication 2170 displayed is incorrect, a malicious entity may exist on the user station 30, and that it is strongly advisable that the user station 30 be formatted, and any other precautionary steps taken to ensure the user's account, identity, or activities are not compromised.

At step 3170, the user determines whether the activity data 2160 received by the base station 20 is correct based on the first indication 2170 presented by the user station 30. If a Trojan or keylogger has been maliciously used to alter the activity data 2160 sent from the user station 30 to the base station 20, the first indication 2170 can be used to indicate that the activity data 2160 received has been compromised.

If the user believes that the activity data 2160 has been altered or is not correct, the user may uncouple the device 2150 from the user station 30 at step 3180. At step 3190, the user logs off the session. This can involve data being sent to the base station 20 indicating that the user has indicated that the session has been terminated. At step 3200, the base station 20 transfers a challenge to the device 2150 to determine if the device 2150 is coupled to the user station 30. At step 3210, the base station 20 determines that the device 2150 has been uncoupled from the user station 30. This may include a timeout period, wherein a response from the device 2150 has not been received, indicating that the device 2150 has been uncoupled. As the activity data 2160 was not authenticated by the user (indicated by the user uncoupling the device 2150 from the user station 30) the activity related to the activity data 2160 is not performed, as indicated by step 3220. For example, a transaction related to transaction data may not be performed due to the transaction data being altered or incorrect.

In the event that the user determines that the activity data 2160 received by the base station 20 is authentic and correct based on the presented first indication 2170, the user indicates that the activity data 2160 is correct at step 3230. This may include pressing a confirmation button using an input device on a user interface of the user station 30.

At step 3240, the user station 30 may transfer, to the base station 20, a second indication 2180 indicative of the confirmation. Preferably, the second indication 2180 is encrypted by the user station 30 and decrypted by the base station 20. The user then logs off the session at step 3250.

At step 3260, the base station 20 generates and transfers a challenge to the device 2150 to ensure that the device 2150 is coupled to the user station 30. At step 3270 the device 2150 responds to the challenge indicating the device 2150 is coupled to the user station 30. At step 3280, the related activity is performed, based on the positive authenticity indicated in the second indication 2180 and the response received from the device 2150.

Figure 13:
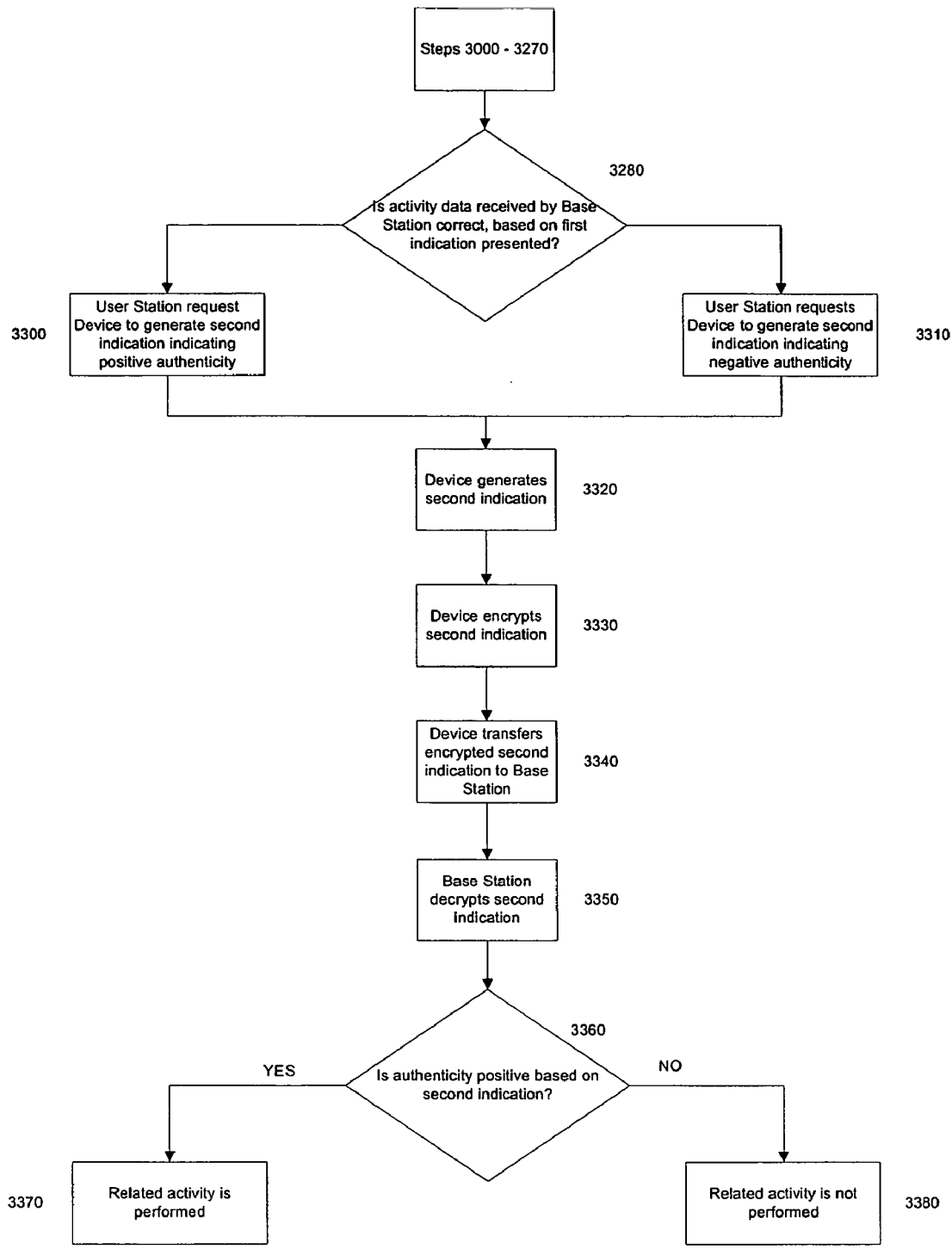
FIG. 13 shows an alternate detailed example of part of the method of FIG. 11.

An alternate example will now be discussed with respect to FIG. 13.

Figure 12A:
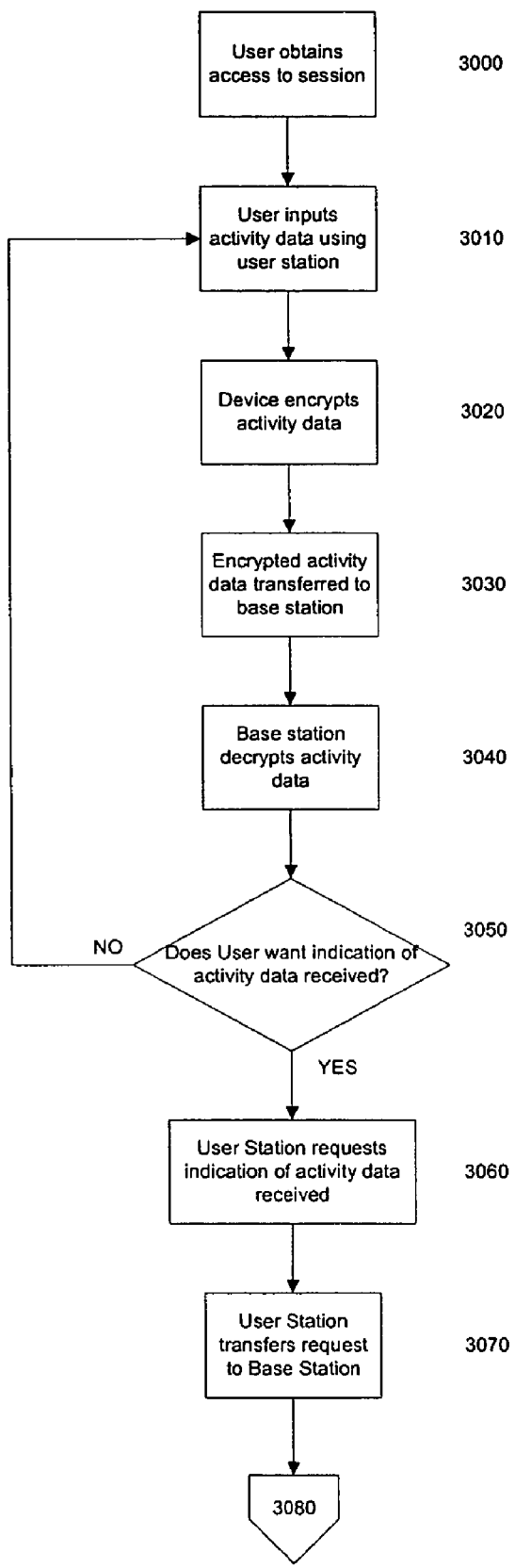
FIG. 12A to 12C shows a more detailed example of the method of FIG. 11.
Figure 12B:
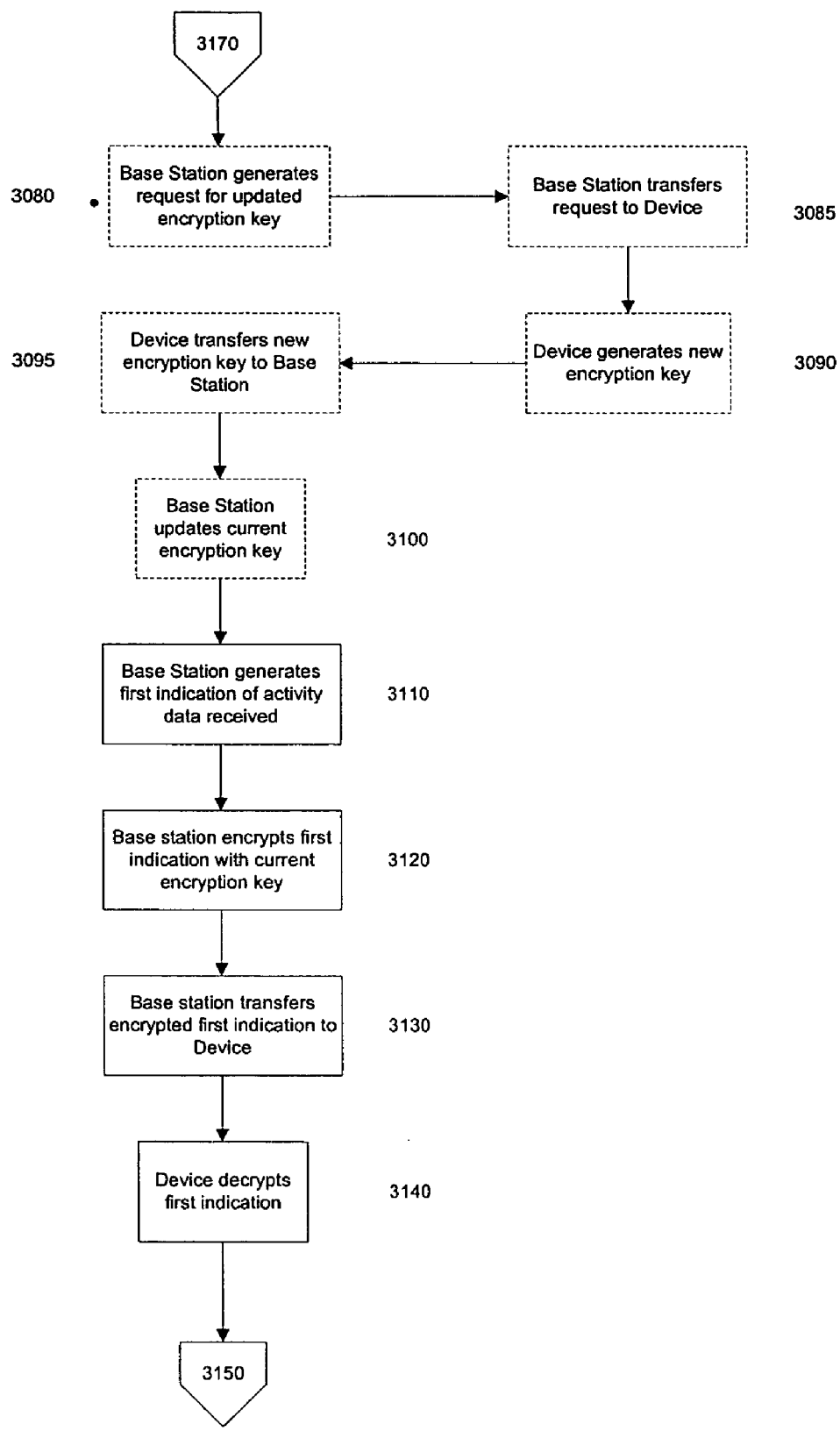
Figure 12C:
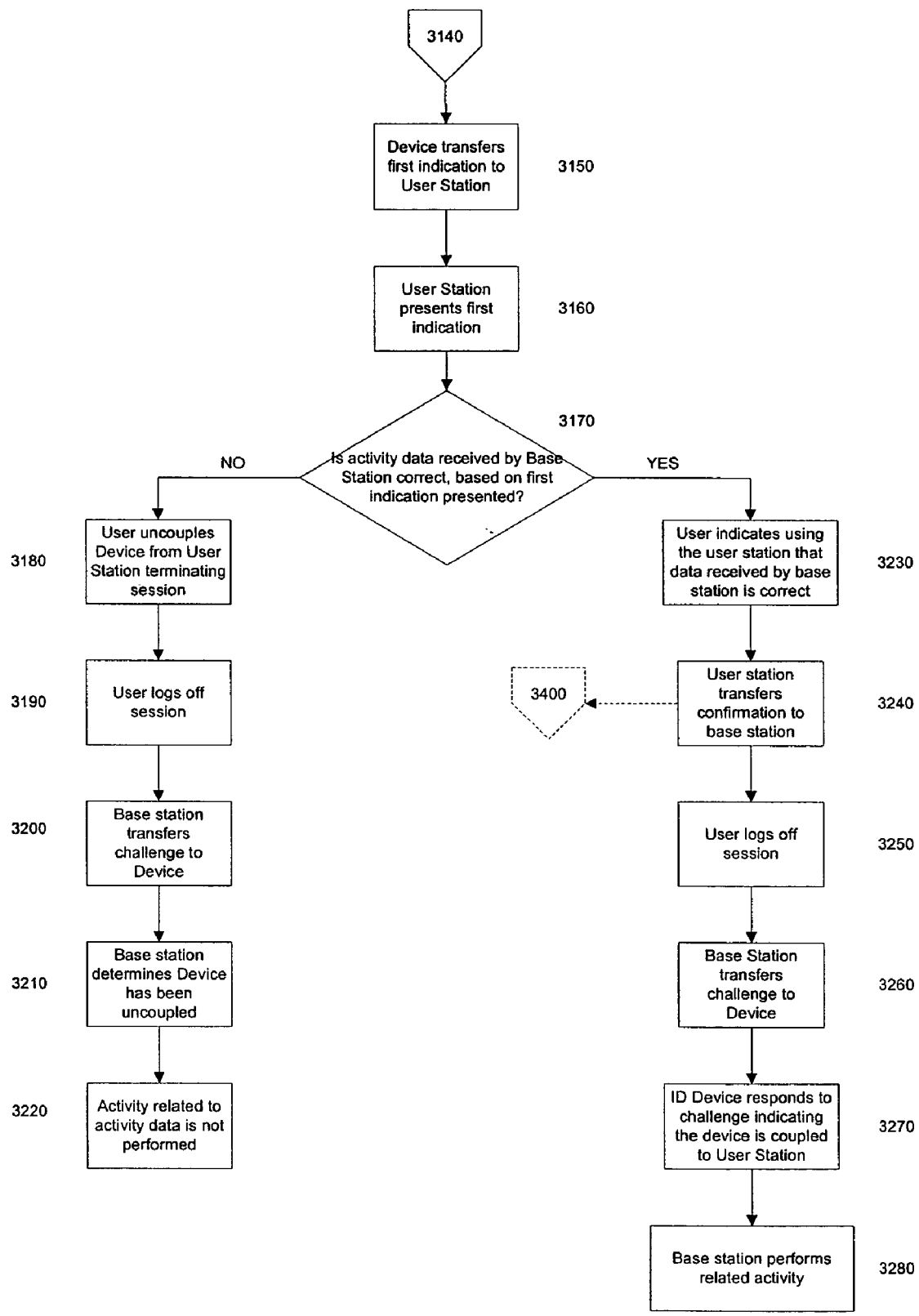

Steps 3000 to 3280 are performed similarly to those described in respect of FIGS. 12A to 12C. If the user decides at step 3280 that the activity data 2160 received by the base station 20 is correct based on the first indication 2170 presented, the user station 30 transfers a request to the device 2150 to generate a second indication 2180 indicating positive authenticity of the activity data 2160 at step 3300. However, if the user determines that the activity data 2160 is incorrect, the user station 30 transfers a request to the device 2150 to generate a second indication 2180 indicating negative authenticity at step 3310.

At step 3320, the device 2150 generates the second indication 2180 based representing the authenticity of the activity data 2160 presented to the user. It is possible that the device 2150 generates a false second indication 2180 to indicate negative authenticity of the activity data 2160 presented. Similarly, the device 2150 may generate a correct second indication 2180 to indicate positive authenticity of the activity data 2160 presented.

At step 3330, the device 2150 encrypts the second indication 2180. Preferably, the device 2150 embeds a new encryption key in the encrypted second indication 2180.

At step 3340, the device 2150 transfers the encrypted second indication 2180 to the base station 20. It will be appreciated that this may include transferring the encrypted second indication 2180 via the user station 30 if direct communication with the base station 20 is not available or appropriate.

At step 3350, the base station 20 decrypts the encrypted second indication 2180. Preferably, the embedded encryption key is extracted from the encrypted second indication 2180 and the current encryption key is updated after the encrypted second indication 2180 is decrypted.

At step 3360, the base station 20 determines, based on the second indication 2180, whether the activity data 2160 received was authentic. If the second indication 2180 indicates a positive authentication, the related activity is performed at step 3370. If the second indication 2180 indicates negative authenticity, the related activity is not performed, as indicated at step 3380.

An example of securely transferring data to a smart card coupled to the device 2150 will now be described with reference to FIGS. 14A and 14B.

Figure 14A:
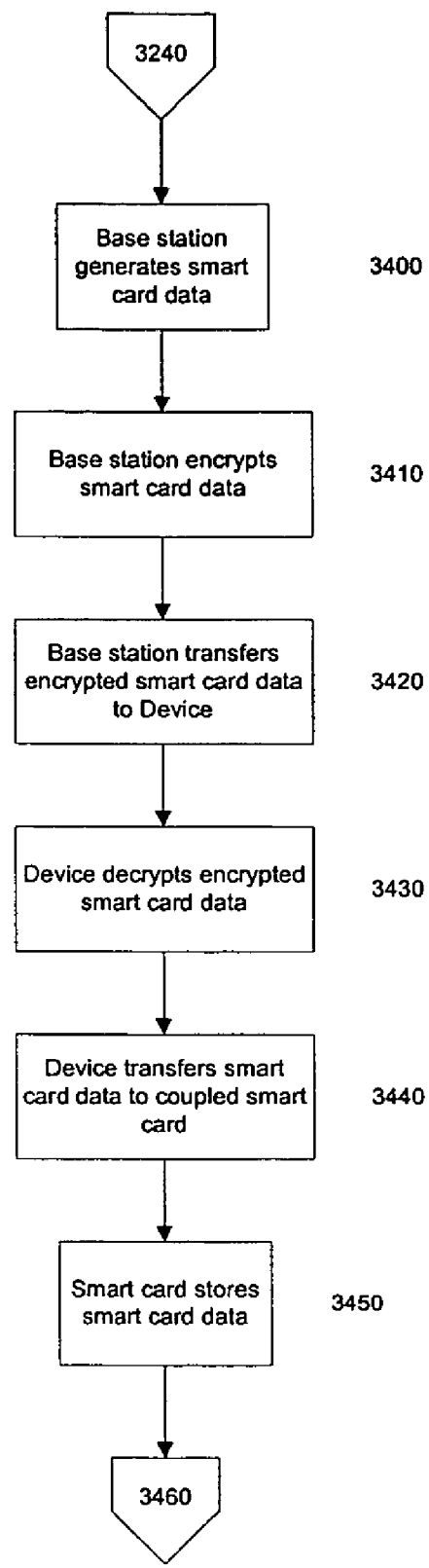
FIG. 14A to 14B shows an example flowchart outlining a method of transferring data to a smart card.
Figure 14B:
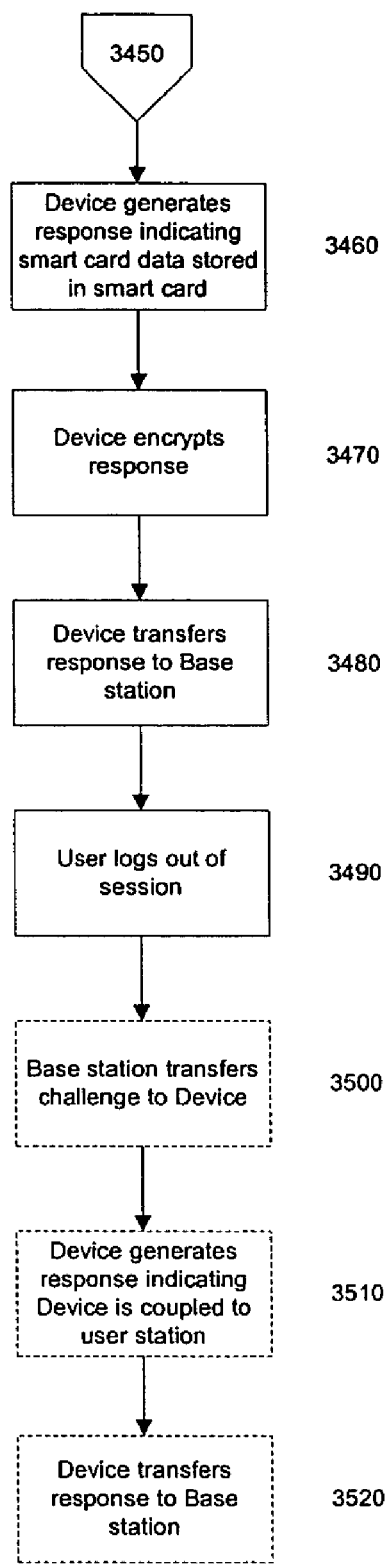

As shown in FIG. 14A, once the second indication 2180 indicating positive authenticity is sent at step 3260 (which is also shown in FIG. 12B), the base station 20 generates smart card data at step 3400. This for example, may be a value indicating funds transfer from the user account to the smart card.

At step 3410, the base station 20 encrypts the smart card data. At step 3420 the base station 20 transfers encrypted smart card data to the device 2150. At step 3430, the device 2150 decrypts the encrypted smart card data, and at step 3440, the device 2150 transfers the smart card data to the coupled smart card.

At step 3450, the smart card stores the smart card data. At step 3460, the device 2150 generates a response indicating the smart card data has been transferred and stored in the smart card. At step 3470, the device 2150 encrypts the response. At step 3480, the device 2150 transfers the response to the base station 20. At step 3490, the user logs out of the session. The log out using the user station 30 may result in a signal being sent to the base station 20 indicating the session has been completed. At optional steps 3500, 3510 and 3520 (as indicated by dotted outlines), the base station 20 may transfer a challenge to the device 2150 to determine whether the device 2150 is still coupled to the user station 30, and if the device 2150 is still coupled, respond to the challenge.

Variations

Figure 2D:
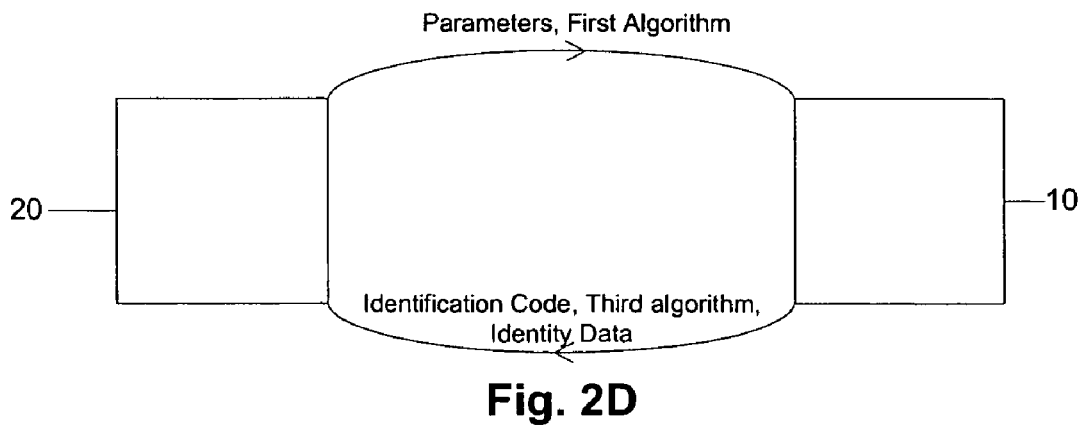

Referring to FIG. 2D, the identification device 10 may include a third identification code algorithm stored in the identification device's memory 12, which is transferred from the identification device 10 to the base station 20. Thus, referring now to FIGS. 7A to 7D and 8A to 8E, once the second identification code algorithm has been applied and generates the second identification code, the second identification device code is used by the third identification code algorithm, thus generating a third identification code. The identification device 10 then generates the identification response including the third identification code algorithm, the third identification code, and the identity data. When the base station 20 receives the identification response 60, the base station 20 reversely applies the third identification code algorithm to obtain the second identification code. Once the base station 20 obtains the second identification code, the base station 20 can apply the first and second identification code algorithms as per FIGS. 7A to 7D and 8A to 8E so as to regenerate the plurality of device codes.

The first and second and third identification code algorithms may be separate segments of a total algorithm. Therefore, the identification device 10 may combines the separate segments of the algorithms in order to generate a total algorithm so as to generate an identification code.

The base station 20 may transfer in the identification request 50 an indicator indicative of an incorrect sub-algorithm. As such, the identification device 10 applies the plurality of sub-algorithms correctly except for the specified sub-algorithm. As such, when the base station 20 regenerates the device codes and creates an identification check code, the identification check code shall be partially incorrect. If the identification check code is partially incorrect, access is granted. If the base station 20 requested a partially incorrect identification check code and the identification check code is correct, access is denied.

It is preferable that the identification device 10 is a lightweight device that typically weighs less than ten grams, perhaps most preferably between five and ten grams. The identification device 10 may optionally include a hook such that it can be easily attached to a key ring carried by a user. The identification device 10 is able to fit in a pocket of a person's clothing or a purse/wallet.

The identification device 10 is ideally enclosed in a casing, wherein the casing is substantially difficult to open. The casing prevents hackers from opening the identification device 10 and copying the device codes in an attempt to reproduce a mimic device. The casing could be welded tight, or include a one-piece moulding. The casing could be made from a rigid material, making it substantially difficult for a hacker to open and copy the device codes. The casing can include a self-destruct mechanism such that when the casing is opened, the device codes are damaged or deleted from memory substantially preventing a hacker copying the identification device 10.

The identification device 10 may include a serial number imprinted on the outside of the case. The serial number is a reference number that the base station 20 can use to identify the device. The serial number may be recorded in the base station's data store 22 such that a record is kept by the base station 20 as to which user possesses a particular identification device 10.

It is preferable that the identification device 10 includes security protection against false identification requests. A hacker may attempt to send a false identification request to the identification device 10 to determine the device codes. The false properties of the identification request 50 may be determined from time and date stamps, incorrect formatting, or any other properties included in the identification request 50, which can indicate to the identification device 10 that a false request has been received. As such, the identification device 10 detects the false identification request 50 and produces a false identification response 60, therefore providing the hacker with no indication as to whether the identification request 50 was correct, and also providing the hacker with incorrect information. The identification device 10 may generate a random number, preferably using electronic interference (as previously discussed), in order to generate a false identification code. When the identification device 10 is coupled to a user station 30, a data log is sent to the base station 20 to record tampering with the identification device 10. This can preferably be used as input for changing the identification algorithm codes. It is preferable that the base station 20 can indicate to the identification device 10 that the log is to be cleared from the identification device store 12. This may be performed by the base station 20 transferring data to the identification device 10 indicative of clearing the log from the identification device store 12. The base station 20 may transfer data indicative of requesting the identification device 10 to clear the store 12 of the data log at the discretion of the base station 20.

The identification device's memory 12 (also known as the store) may have a capacity that varies between a few bytes up to a number of gigabytes.

Preferably, the identification device 10 includes an internal power source to power the identification device 10. Whilst the identification device 10 is coupled to the user station 30, the power supply may recharge. Alternatively, the identification device 10 may be a passive device, wherein the identification device 10 is powered whilst coupled to the user station 30.

When the identification device 10 recognises that it has been coupled to a user station 30, the identification device 10 may install driver software included on the identification device 10 onto the user station 30. This helps prevent previously installed driver software from being tampered with and being used by the identification device 10.

The identification device 10 may also update the driver software whilst coupled to the user station 30. This may include the base station 20 recognising that a new version of driver software exists and transfers, via the user station 30, the updated driver software to the identification device 10.

The plurality of random numbers generated by the base station 20 may be formatted in a particular order prior to being transferred to the identification device 10. For example, the base station 20 may require that the third random number is not larger than the first random number.

Optionally, two or more identification devices 10 may be coupled to a user station 30 in order to authenticate associated users simultaneously. For example, a business may require two or more identifications in order to perform a transaction. Therefore, two or more identification devices 10 may be coupled to the user station 30 and each identification code requires authentication before the transaction is allowed to continue.

The identification device 10 may preferably include a smart card port to couple with smart cards or similar devices.

The identification device 10 optionally includes continual session authentication, wherein a plurality of identification requests are received throughout the session whilst the base station provides granted access. The base station 20 may request authentication that the identification device 10 is still coupled to the user station 30 preventing the removal of the identification device 10 from the user station 30 during the granted access. This feature also prevents a connection to the base station 20 being left open, liable for security attacks.

Therefore, if the identification device 10 is uncoupled from the user station 30, the granted access from the base station 20 is terminated. Failure of the identification device 10 to transfer an identification response to the base station 20 within a time period may result in the granted access being terminated.

The identification device 10 may include a temperature sensor to measure the temperature of the identification device 10. If the temperature measured using the sensor is determined to be outside a predefined temperature range including a minimum and maximum threshold, the device codes are deleted or damaged in the identification device 10.

It is preferable that the authentication of the username and the password occur prior to the authentication of the identification device 10. However, it is appreciated that the authentication process could occur at substantially the same time or in a reverse order.

Optionally, if the user station 30 or identification device 10 is idle for a particular period of time whilst access is granted, the session may be terminated by the base station 20, thus authentication may again be required.

The identification system 1 is not limited to internet access, as it equally applies to any form of network access authorisation such as complementing an existing customer card personal identification number utilised for Automatic Teller Machines or EFTPOS devices.

The identification system 1 optionally includes multiple base stations 20. The secure information stored on each base station 20 may be different to information stored on other base stations 20 in the network. However, all base stations 20 in the network share records including the identification check code, such that a single identification device 10 can be used for different base stations 20.

Optionally, other information may be recorded in the base station's data store 22. This may include information indicative of particular states of the identification device 10 such as if it has been issued, lost, damaged, or stolen, with associated dates and times may also be stored. Other details that are recorded may include login details such as times of authentication, session periods, transfer of data, processes carried out.

It is preferable that the identification system 1 includes a backup server able to backup information stored in the base station 20. Preferably the data is backed up daily, such that if the data becomes corrupted, the data can be restored in a timely manner.

Optionally, the base station 20 may include software that generates and transmits reports containing activity details, activity warnings, general warnings and details of suspected fraudulent activities as well as statistical and management information. It is also preferable that the base station 20 includes software that summarises all activities by a base station 20 for a particular time period.

It is preferable that each base station 20 generates different identification check codes for a user. Therefore, each identification check code converter may be different at each base station 20 as it uses a different algorithm to generate the identification check code for a particular customer. Thus, if one particular base station's records is compromised, other base station's records are not compromised as a different algorithm is used at each base station to generate the identification check code.

Referring to FIGS. 10, 11, 12A to 12C, 13A to 13B, and 14, the method of encrypting data and decrypting data is preferably similar to that used for determining the identity of the user using the identification device 10. As such, the methods used in FIGS. 2A to 2D can be used when encrypting and decrypting activity data 2160 transferred between the user station 30, base station 20 and device 2150 such as to create a more secure transfer of activity data 2160 during the session of data.

As the encryption method of the identification method and system can be used for the authentication method and system, it will be appreciated that data transferred from the device 2150 to the base station may include a first data transfer algorithm, such that the base station 20 can generate a response in accordance with the first data transfer algorithm. The first data transfer algorithm may be randomly selected by the device 2150 from a plurality of predetermined algorithms.

Alternatively, the device 2150 may randomly generate a first data transfer algorithm each time data is to be transferred to the base station 20.

The device 2150 may randomly select or generate the first data transfer algorithm by measuring electronic interference (also known as "white noise") so as to generate real random numbers rather than pseudo-random numbers. The real random numbers are then used to either randomly select the first data transfer algorithm from a plurality of stored algorithms, or alternatively generate, based on the real random numbers, the first data transfer algorithm. The first data transfer algorithm may be embedded in the data to be transferred and the data, including the algorithm, is encrypted prior to being transferred. Thus, once the base station 20 extracts the first data transfer algorithm, the base station 20 uses the first data transfer algorithm to generate a response.

The device 2150 may include in the store a second data transfer algorithm similar to the second identification code algorithm described above, wherein the device 2150 generates the data to be transferred to the base station 20 in accordance with the second data transfer algorithm. The device includes an identity which is included in the data sent to the base station 20, wherein the base station uses the device's identity and records stored at the base station store to determine the second data transfer algorithm used by the device. Once the base station determines, using the device's identity and base station records, the second algorithm used by the device 2150, the base station 20 reversely applies the determined second data transfer algorithm to decode the data sent from the device 2150.

The base station 20 may additionally or alternatively randomly select or generate a third data transfer algorithm and embed this in the response which is to be sent to back to the device 2150. The second and third data transfer algorithms may operate as segments which are combined and then applied to the data to be transferred to generate a response to be sent to the base station 20. Alternatively, the second and third data transfer algorithms may be applied sequentially by the device 2150 to the data before being transferred to the base station 20. Therefore, when the device 2150 receives a response from the base station 20, the third data transfer algorithm is extracted, and when any further data is to be transferred to the base station 20, the device 2150 uses the second and third data transfer algorithms to generate the data to be transferred to the base station 20.

Alternatively, if the device does not include a stored second data transfer algorithm, the received third data transfer algorithm may be used by itself to generate the data to be transferred to the base station 20. It will be appreciated that the first, second, and third data transfer algorithms may be encryption algorithms.

The transfer of first and third data transfer algorithms allows for a more secure method of transferring data. If an observer determines the set of algorithms used in one request or response, the observer may not be able to reapply the determined set of algorithms for a subsequent request or response as the set of algorithms used has randomly changed. Furthermore, the security of the authentication is increased due to new encryption keys being generated and transferred by the device 2150 to the base station 20 when data is being transferred.

It will be appreciated that the generation and transfer of the first and third identification code algorithms and the application of the first, second and third identification code algorithms for the identification device 10 and system 1 discussed above can be similarly applied for generating and transferring the first and third data transfer algorithms and for applying the first, second and third data transfer algorithms for the device 2150 and authentication method and system.

It will also be appreciated that if the identification device 10 is the device 2150, the method and system of generating the first and second algorithms discussed above for the identification method and system can also be used for generating and transferring the first and third data transfer algorithms, and applying the first, second and third data transfer algorithms.

It will also be appreciated that the base station may randomly select or generate the third data transfer algorithm using electrical interference similar to that used by the device 2150 and the identification device 10.

As would be clear from the above examples, it will also be appreciated that each response transferred from the identification device 10 or device 2150 includes a new embedded encryption key, wherein when the base station 20 extracts the new embedded encryption key, the current encryption key stored in the base station 20 is updated, such that any further encryption or decryption performed by the base station 20 uses of the new encryption key.

Although the present invention has been described in terms of the presently preferred embodiments, it is to be understood that the disclosure is not to be interpreted as limiting. Various alterations and modifications will no doubt become apparent to those skilled in the art after having read the above disclosure. All such alterations and modifications should be considered within the spirit and scope of the invention as broadly herein before described.

The invention claimed is:

1. A method of a user obtaining access to secure information stored on a base station using an identification device, wherein the identification device includes a store including code data and at least one predetermined rule, the method including, in the identification device:
   receiving, from the base station, request data including at least one algorithm and at least one parameter;
   generating a plurality of modified code data portions using the at least one algorithm, the at least one parameter, and the code data;
   ordering, according to the at least one predetermined rule and the at least one parameter, the plurality of modified code data portions to generate ordered data, wherein the ordered data includes the plurality of modified code data portions concatenated in an ordered sequence defined by the at least one predetermined rule and the at least one parameter; and
   transferring, to the base station, indicating data indicative of the ordered data, thereby allowing the base station to authenticate the user using the indicating data.

2. The method according to claim 1, wherein the identification device includes a temperature sensor, wherein the method includes:
   sensing a temperature of the identification device; and
   comparing the sensed temperature to an allowable temperature range;
   if the sensed temperature is outside the allowable temperature range, deleting the data in the store.

3. The method according to claim 1, wherein the identification device includes an encryption module, wherein the method includes, in the identification device:
   generating a key using electronic interference; and
   encrypting, using the encryption module and the key, the indicating data.

4. The method according to claim 1, wherein the method includes, in the identification device:
   identifying a false identification request; and,
   generating a false identification response.

5. The method according to claim 1, wherein two or more users are required to be authenticated in order to gain access to secure information, the method includes:

coupling two or more identification devices to a user station, thereby allowing the base station to authenticate response data received from the two or more coupled identification devices and grant access if the two or more identification devices are successfully authenticated.

6. The method according to claim 1, wherein the code data includes a plurality of code data portions and the at least one algorithm includes a plurality of sub-algorithms, and the method includes:

the identification device applying each of the sub-algorithms to the code data portions to generate the modified code data portions.

7. An identification device used by a user to obtaining access to secure information stored on a base station, wherein the identification device includes a store including code data and at least one predetermined rule, the identification device being configured to:

receive, from the base station, request data including at least one algorithm and at least one parameter;

generate a plurality of modified code data portions using the at least one algorithm, the at least one parameter, and the code data;

order, according to the at least one predetermined rule and the at least one parameter, the plurality of modified code data portions to generate ordered data, wherein the ordered data includes the plurality of modified code data portions concatenated in an ordered sequence defined by the at least one predetermined rule and the at least one parameter; and transfer, to the base station, indicating data indicative of the ordered data, thereby allowing the base station to authenticate the user using the indicating data.

8. A method of a base station authenticating a user using an identification device for obtaining access to secure information stored on the base station, wherein the identification device includes a store including code data and at least one predetermined rule, and the base station includes a processor and a data store including the at least one predetermined rule and at least one parameter, the method including, in the base station:

transferring, to the identification device, request data including at least one algorithm and the at least one parameter;

receiving, from the identification device indicating data generated by the identification device by:

generating a plurality of modified code data portions using the at least one algorithm, the at least one parameter, and the code data;

ordering, according to the at least one predetermined rule and the at least one parameter, the plurality of modified code data portions to generate ordered data, wherein the ordered data includes the plurality of modified code data portions concatenated in an ordered sequence defined by the at least one predetermined rule and the at least one parameter;

determining the at least one algorithm used by the identification device; and reversely applying the at least one algorithm to the indicating data using the at least one predetermined rule and the at least one parameter to generate the code data, thereby allowing the base station to authenticate the user.

9. The method according to claim 8, wherein the method includes, in the base station:

generating the code data by reversely applying the at least one predetermined rule to the indicating data in accordance with the at least one parameter.

10. The method according to claim 8, wherein the method includes the base station selecting the at least one algorithm from a plurality of algorithms stored in the data store of the base station.

11. The method according to claim 8, wherein two or more users are required to be authenticated in order to gain access to secure information, the method includes:

receiving indicating data from two or more identification devices;

authenticating the indicating data received from the two or more identification devices; and, granting access if the two or more identification devices are successfully authenticated.

12. A base station used for authenticating a user using an identification device for obtaining access to secure information stored on the base station, the identification device includes a store including code data and at least one predetermined rule, wherein the base station includes a processor and a data store including the at least one predetermined rule and at least one parameter, the processor being configured to:

transfer, to the user station, request data including at least one algorithm and the at least one parameter;

receive, from the user station, indicating data generated by the identification device by:

generating a plurality of modified code data portions using the at least one algorithm, the at least one parameter, and the code data;

ordering, according to the at least one predetermined rule and the at least one parameter, the plurality of modified code data portions to generate ordered data, wherein the ordered data includes the plurality of modified code data portions concatenated in an ordered sequence defined by the at least one predetermined rule and the at least one parameter;

determine the at least one algorithm used by the identification device; and reversely apply the at least one algorithm to the indicating data using the at least one predetermined rule and the at least one parameter to generate the code data, thereby allowing the base station to authenticate the user.

13. A method of authenticating activity data received by a base station, wherein the activity data relates to an activity, wherein the method includes, in the base station:

receiving data including a first algorithm selected from a plurality of algorithms by a device in data communication with the base station, and a request to generate and transfer a first indication of the activity data received by the base station;

generating a response, using the first algorithm, indicative of a first indication of the activity data received by the base station;

transferring the response to the device, wherein the device transfers the first indication to a user station thereby allowing determination of the authenticity of the activity data, and wherein the user station transfers to the device a second indication indicating the authenticity of the activity data;

receiving, from the device, a second indication of the determination; and in response to a positive authentication, performing the activity.

14. The method according to claim 13, wherein the request is encrypted, wherein the method includes the base station using a current encryption key to decrypt the request, wherein the request includes a new encryption key, wherein when the request has been decrypted the method includes the base station updating the current encryption key with the new encryption key.

15. The method according to claim 13, wherein the method includes the base station:
  selecting or generating a second algorithm; and
  generating the response, wherein the response is indicative of the second algorithm which is used by the device for generating data indicative of the second indication.

16. A base station used for authenticating activity data received by the base station, wherein the activity data relates to an activity, wherein the base station includes a processing system configured to:
  receive data including a first algorithm selected from a plurality of algorithms by a device in data communication with the base station, and a request to generate and transfer a first indication of the activity data received by the base station;
  generate a response, using the first algorithm, indicative of a first indication of the activity data received by the base station;
  transfer the response to the device, wherein the device transfers the first indication to a user station thereby allowing determination of the authenticity of the activity data, and wherein the user station transfers to the device a second indication indicating the authenticity of the activity data;
  receive, from the device, a second indication of the determination; and
  in response to a positive authentication, perform the activity.

17. A method of authenticating activity data received by a base station, wherein the activity data relates to an activity, wherein the method includes, in a device:
  generating data including a first algorithm selected from a plurality of algorithms by the device, and a request for a first indication of the activity data;
  transferring the data to the base station;
  receiving, from the base station, a response including the first indication of the activity data received by the base station, wherein the first indication is encrypted;
  decrypting the encrypted first indication,
  transferring the first indication to a user station thereby allowing determination of the authenticity of the activity data;
  receiving, from the user station, a second indication indicating the authenticity of the activity data;
  encrypting the second indication; and
  transferring, to the base station, the encrypted second indication, wherein in response to a positive authentication, the activity is performed.

18. The method according to claim 17, wherein the method includes one of:
  the device randomly selecting the first algorithm from a plurality of predetermined first algorithms;
  the device randomly generating the first algorithm.

19. The method according to claim 17, wherein the method includes:
  the device receiving the response from the base station, wherein the response is indicative of a second algorithm; and
  the device using the second algorithm to generate data indicative of the second indication.

20. The method according to claim 17, wherein the method includes the device receiving the first indication and transferring the second indication to the base station via a user station, wherein the device is coupled to the user station.

21. A device for authenticating activity data received by a base station, wherein the activity data relates to an activity, wherein the device includes a processor configured to:
  generate data including a first algorithm selected from a plurality of algorithms by the device, and a request for a first indication of the activity data and a request for a first indication of the activity data;
  transfer the data to the base station;
  receive, from a base station, a response including the first indication of the activity data received by the base station, wherein the first indication is encrypted;
  decrypt the encrypted first indication;
  transfer the first indication to a user station thereby allowing determination of the authenticity of the activity data;
  receive, from the user station, a second indication indicating the authenticity of the activity data;
  encrypting the second indication; and
  transfer, to the base station, the encrypted second indication, wherein in response to a positive authentication, the activity is performed.

* * * * *